(12) United States Patent
Berry et al.

(10) Patent No.: US 6,766,511 B1
(45) Date of Patent: Jul. 20, 2004

(54) APPARATUS AND METHOD FOR PERFORMING SYMBOLIC RESOLUTION OF MODULES USING STATIC REPRESENTATIONS OF A TRACE

(75) Inventors: Robert Francis Berry, Austin, TX (US); Chester Charles John, Jr., Round, TX (US); Frank Eliot Levine, Austin, TX (US); Christopher Michael Richardson, Austin, TX (US); Robert J. Urguhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 09/613,194

(22) Filed: Jul. 10, 2000

(51) Int. Cl.$^7$ ................................................. G06F 9/44
(52) U.S. Cl. ........................... 717/128; 717/154; 714/45
(58) Field of Search ................................. 717/127, 128, 717/130, 131, 124–126, 129, 132–167; 714/45

(56) References Cited

U.S. PATENT DOCUMENTS

| | | | | |
|---|---|---|---|---|
| 5,784,553 A | * | 7/1998 | Kolawa et al. | 714/38 |
| 5,950,003 A | * | 9/1999 | Kaneshiro et al. | 717/130 |
| 6,289,503 B1 | * | 9/2001 | Berry et al. | 717/128 |
| 6,317,872 B1 | * | 11/2001 | Gee et al. | 717/152 |
| 6,338,159 B1 | * | 1/2002 | Alexander et al. | 717/128 |
| 6,381,735 B1 | * | 4/2002 | Hunt | 717/158 |
| 6,382,846 B1 | * | 5/2002 | Lai et al. | 712/209 |

OTHER PUBLICATIONS

Rosenberg, Jonathan B., "How Debuggers Work: Algorithms, Data Structures, and Architecture", 1996, John Wiley & Sons, p. 151–172.*

* cited by examiner

Primary Examiner—Antony Nguyen-Ba
(74) Attorney, Agent, or Firm—Duke W. Yee; Leslie A. Van Leeuwen; Stephen J. Walder, Jr.

(57) ABSTRACT

An apparatus and method for cataloging symbolic data for use in performance analysis of computer programs is provided. The apparatus and method stores symbolic data for loaded modules during or shortly after a performance trace and utilizes the stored symbolic data when performing a performance analysis at a later time. A merged symbol file is generated for a computer program, or application, under trace. The merged symbol file contains information useful in performing symbolic resolution of address information in trace files for each instance of a module. During post processing of the trace information generated by a performance trace of a computer program, symbolic information stored in the merged symbol file is compared to the trace information stored in the trace file. The correct symbolic information in the merged symbol file for loaded modules is identified based a number of validating criteria. The correct symbolic information for the loaded modules may then be stored as an indexed database that is used to resolve address information into corresponding symbolic information when providing the trace information to a display for use by a user.

30 Claims, 13 Drawing Sheets

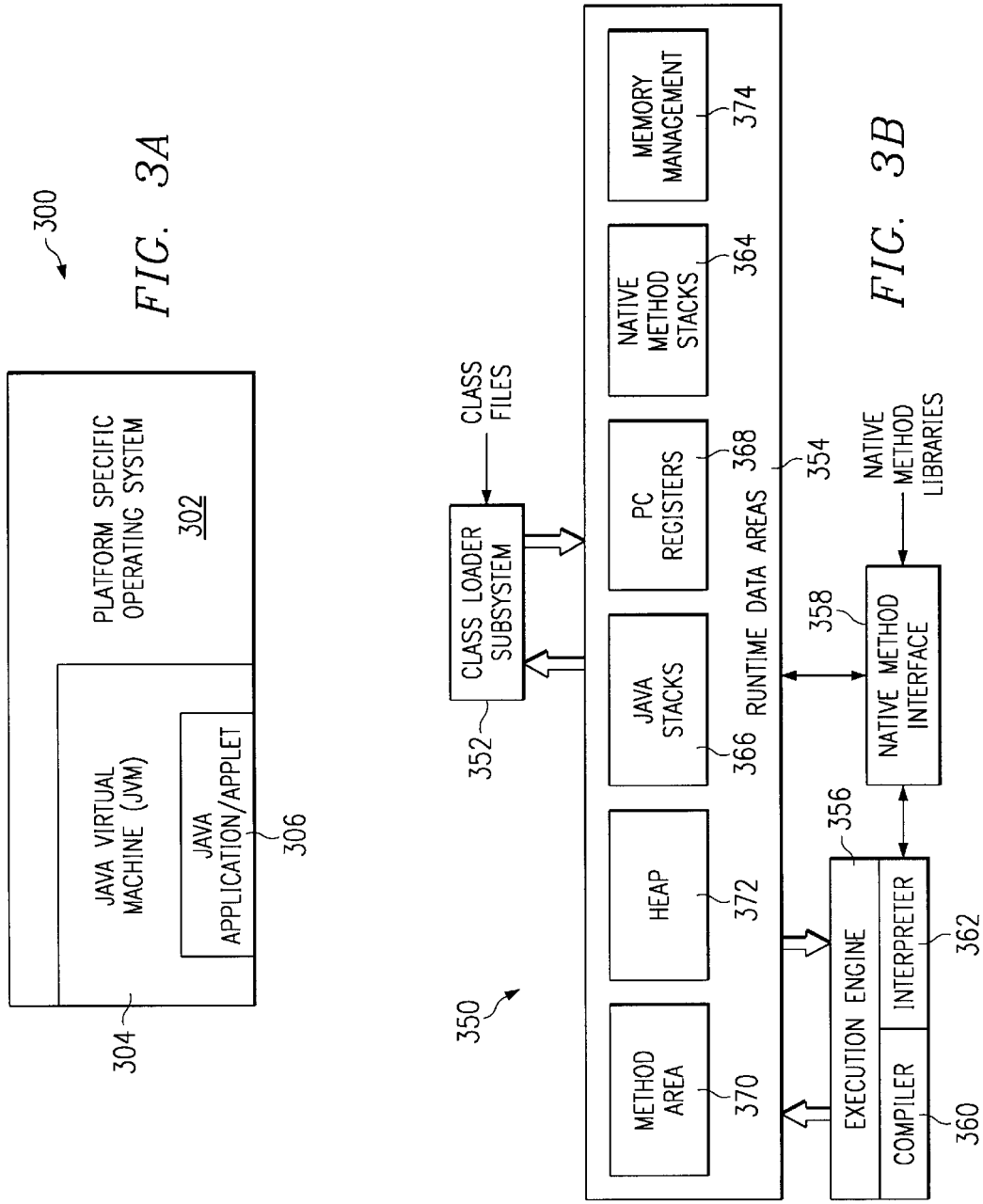

Sample Trace file:

```
A8  1   4:33900363  0  00000054
19  38  4:33904248  0  00000002           80140000  00080000  68000000  000E42C3  36224CDA  .text  C:\WINNT\foo.exe
19  38  4:339045d4  0  00000002           801C0000  00008000  60000000  000E42C3  36224CDA  PAGE   C:\WINNT\foo.exe
11  B4  4:339007D7  0           3E8
11  B3  4:33901915  0  00000000           00000000
19  38  4:33b280E7  0  00000002           80240000  000C0000  68000000  0001BD3D  36DDB326  .text  C:\temp\foo.exe
19  38  4:33904473  0  00000002           80300000  000C0000  60000000  0001BD3D  36DDB326  PAGE   C:\temp\foo.exe
10  03  4:33C35EC5  0  80249000           00000002   00000005  00000000  00000000  00000000  00000000
19  38  4:33E04248  0  00000002           80140000
19  39  4:33E04248  0  00001F9A           445AF040  00000074  java/lang/String.<init>(([C)V)
19  44  4:55A04368  0  00001F9A           445AF0D8  0000007E  java/lang/System.arraycopy (((Ljava/lang/Object;Ljava/lang/Object;II)V
```

FIG. 11

Sample MTE file:

```
19  38  4:33904248  0  00000002           80140000  00080000  68000000  000E42C3  36224CDA  .text  C:\WINNT\foo.exe
19  38  4:339045d4  0  00000002           801C0000  00008000  60000000  000E42C3  36224CDA  PAGE   C:\WINNT\foo.exe
19  38  4:33b280E7  0  00000002           80240000  000C0000  68000000  0001BD3D  36DDB326  .text  C:\temp\foo.exe
19  38  4:33904473  0  00000002           80300000  000C0000  60000000  0001BD3D  36DDB326  PAGE   C:\temp\foo.exe
19  39  4:33E04248  0  00000002           80140000
19  44  4:55A04368  0  00001F9A           445AF040  00000074  java/lang/String.<init>(([C)V)
19  44  4:55A04368  0  00001F9A           445AF0D8  0000007E  java/lang/System.arraycopy (((Ljava/lang/Object;Ljava/lang/Object;II)V
```

FIG. 12

SAMPLE DATABASE:
Address lookup by (pid:address) gives:
2:80140000 – C:\WINNT\foo.exe(subroutine1)
2:80180000 – C:\WINNT\foo.exe(subroutine2)
2:80240000 – C:\temp\foo.exe(subroutine1)
2:80280000 – C:\temp\foo.exe(subroutine2)
2:802C0000 – C:\temp\foo.exe(subroutine3)
FIG. 13A
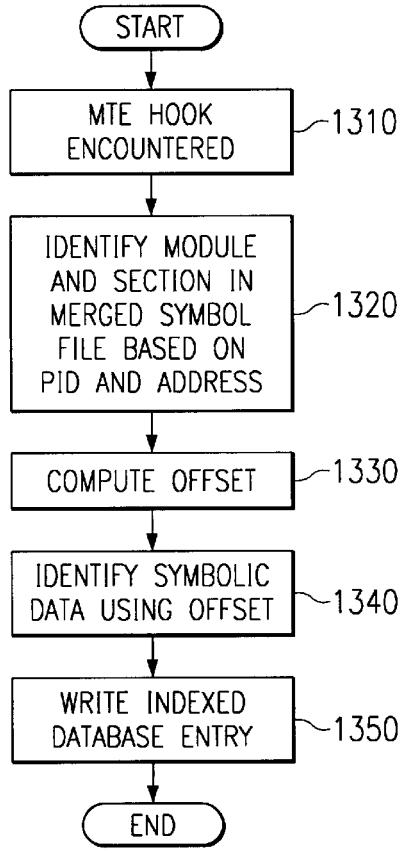
FIG. 13B
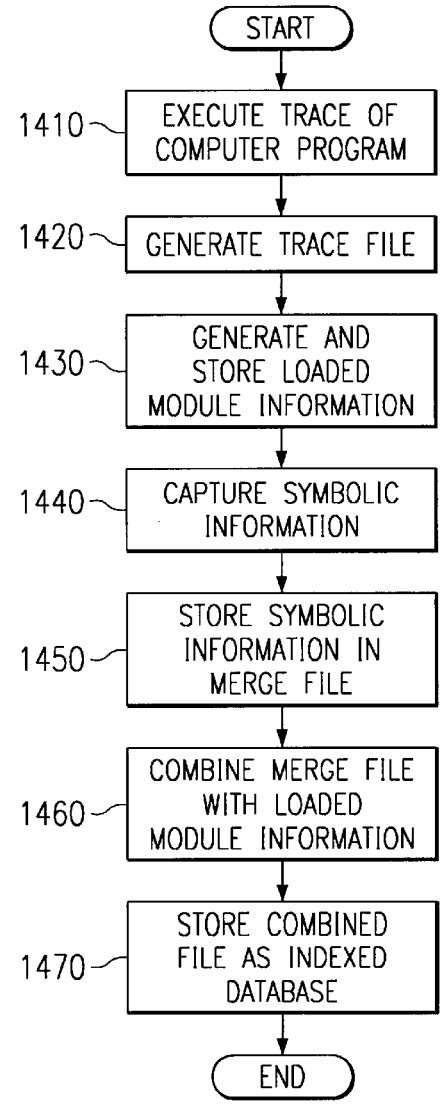
FIG. 14

```
FileName \winnt\system32\hal.dll
TaskName system
pid 0
start 80016180
size 00001e00
SegName PAGE SegNo 0x3
Symbols a
80016180    6604   Start_Segment_#3
80016604    113e   HalGetAdapter
80017742      1c   IoAssignDriveLetters
8001775e      1c   IoReadPartitionTable
8001777a      1c   IoSetPartitionInformation
80017796      f0   IoWritePartitionTable
80017886      34   HalAdjustResourceList
800178ba      44   HalAssignSlotResources
800178fe     682   HalGetInterruptVector
80017f80       0   End_Segment_#3
```

*FIG. 19*

```
FileName d:\winnt\system32\hal.dll
TaskName system
pid ????
start 0
size 00001e00
SegName PAGE SegNo 0x3
Symbols a
0           6604   Start_Segment_#3
474         113e   HalGetAdapter
15b2          1c   IoAssignDriveLetters
15ce          1c   IoReadPartitionTable
15ea          1c   IoSetPartitionInformation
1605          f0   IoWritePartitionTable
16f5          34   HalAdjustResourceList
1739          44   HalAssignSlotResources
1dbb         682   HalGetInterruptVector
253d           0   End_Segment_#3
```

*FIG. 20*

APPARATUS AND METHOD FOR PERFORMING SYMBOLIC RESOLUTION OF MODULES USING STATIC REPRESENTATIONS OF A TRACE

CROSS-REFERENCE TO RELATED APPLICATIONS

The present invention is related to the following applications entitled "Apparatus and Method for Cataloging Symbolic Data for Use in Performance Analysis of Computer Programs", U.S. application Ser. No. 09/613,190; Apparatus and Method for Generating a Merged Symbol File for Verifying Symbolic Data", U.S. application Ser. No 09/613,095; "Apparatus and Method for Creating an Indexed Database of Symbolic Data for Use with Trace Data of a Computer Program", U.S. application Ser. No. 09/613,101; "Apparatus and Method for Performing Symbolic Resolution of Modules Using Static Representations of a Trace", U.S. application Ser. No. 09/613,194; "Apparatus and Method for Creating a Trace File for a Trace of a Computer Program Based on Loaded Module Information", U.S. application Ser. No. 09/612,877; all of which are filed even date hereof, assigned to the same assignee, and incorporated herein by reference.

BACKGROUND OF THE INVENTION

1. Technical Field

The present invention is directed to an apparatus and method for cataloging symbolic data for use in performance analysis of computer programs. In particular, the present invention is directed to an apparatus and method of storing symbolic data for executable modules. The symbolic data is utilized when performing a performance analysis.

2. Description of Related Art

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules which allocate the largest amount of memory or perform the most I/O requests. Hardware performance tools may be built into the system or added at a later point in time.

Software performance tools are also useful in data processing systems, such as personal computer systems, which typically do not contain many, if any, built-in hardware performance tools. One known software performance tool is a trace tool. A trace tool may use more than one technique to provide trace data that indicates execution flows for an executing program. One technique keeps track of particular sequences of instructions by logging certain events as they occur, so-called event-based profiling technique. For example, a trace tool may log every entry into, and every exit from, a module, subroutine, method, function, or system component. Alternately, a trace tool may log the requester and the amounts of memory allocated for each memory allocation request.

Typically, a time-stamped record, where "time" is defined as any monitonically increasing metric, such as, number of instructions executed, is produced for each such event. Corresponding pairs of records similar to entry-exit records also are used to trace execution of arbitrary code segments, starting and completing I/O or data transmission, and for many other events of interest.

In order to improve performance of code generated by various families of computers, it is often necessary to determine where time is being spent by the processor in executing code, such efforts being commonly known in the computer processing arts as locating "hot spots." Ideally, one would like to isolate such hot spots at the instruction and/or source line of code level in order to focus attention on areas which might benefit most from improvements to the code.

Another trace technique involves periodically sampling a program's execution flows to identify certain locations in the program in which the program appears to spend large amounts of time. This technique is based on the idea of periodically interrupting the application or data processing system execution at regular intervals, so-called sample-based profiling. At each interruption, information is recorded for a predetermined length of time or for a predetermined number of events of interest.

For example, the program counter of the currently executing thread may be recorded during the intervals. These values may be resolved against a load map and symbol information for the data processing system at analysis time, and a profile of where the time is being spent may be obtained from this analysis.

For example, isolating such hot spots to the instruction level may identify significant areas of sub-optimal code which helps performance analysts focus their attention on improving the performance of the "important" code. This may also help compiler writers to focus their attention on improving the efficiency of the generated code. This is especially true for "Jitted" code (which is described later in this application). Another potential use of instruction level detail is to provide guidance to the designer of future systems. Such designers employ profiling tools to find characteristic code sequences and/or single instructions that require optimization for the available software for a given type of hardware.

Data processing system applications are typically built with symbolic data and may even be shipped to client devices with symbolic data still present in the modules. Symbolic data is, for example, alphanumeric representations of application module names, subroutine names, function names, variable names, and the like.

The application is comprised of modules written as source code in a symbolic language, such as FORTRAN or C++, and then converted to a machine code through compilation of the source code. The machine code is the native language of the computer. In order for a program to run, it must be presented to the computer as binary-coded machine instructions that are specific to that CPU model or family.

Machine language tells the computer what to do and where to do it. When a programmer writes: total=total+subtotal, that statement is converted into a machine instruction that tells the computer to add the contents of two areas of memory where TOTAL and SUBTOTAL are stored.

Since the application is executed as machine code, performance trace data of the executed machine code, generated by the trace tools, is provided in terms of the machine code, i.e. process identifiers, addresses, and the like. Thus, it may be difficult for a user of the trace tools to identify the modules, instructions, and such, from the pure machine code representations in the performance trace data. Therefore, the trace data must be correlated with symbolic data to generate trace data that is easily interpreted by a user of the trace tools.

The symbolic data with which the trace data must be correlated may be distributed amongst a plurality of files. For example, the symbolic data may be present in debug files, map files, other versions of the application, and the like. In the known performance tool systems, in order to correlate the symbolic data with the performance trace data, the performance tool must know the locations of one or more of the sources of symbolic data and have a complex method of being able to handle redundancies in the symbolic data.

In addition, such correlation is typically performed during post-processing of the performance trace data. Thus, an additional separate step is required for converting performance trace data into symbolic representations that may be comprehended by a performance analyst.

The conversion of performance trace data into symbolic representations is performed at a time that may be remote to the time that the performance trace is performed. As a result, the symbolic data may not be consistent with the particular version of the computer program executed during the trace. This may be due to the fact that, for example, a newer version of the application was executed during the trace and the symbolic data corresponds to an older version of the application.

This may be especially true for applications whose symbolic data is maintained at a supplier's location with the machine code being distributed to a plurality of clients. In such a case, the supplier may continue to update the symbolic data, i.e. create new versions of the application, but fail to provide the newest version of the application to all of the clients. In this scenario, if a performance trace were to be performed, the symbolic data maintained by the supplier may not be the same version as the machine code on which the performance trace is performed.

Thus, it would be beneficial to have a mechanism by which symbolic data for a plurality of sources may be combined into a single source of symbolic data for an application undergoing performance analysis and being traced. It would further be beneficial to have a mechanism for verifying the symbolic data as corresponding to the same version of the application undergoing performance analysis and being traced. Additionally, it would be beneficial to have a mechanism that allows for symbolic resolution to be performed as an integrated operation to the performance trace of the application.

SUMMARY OF THE INVENTION

The present invention provides an apparatus and method for cataloging symbolic data for use in performance analysis of computer programs. In particular, the present invention provides an apparatus and method of storing symbolic data for executable modules. The symbolic data is used when performing a performance trace.

The present invention includes a mechanism by which a merged symbol file is generated for a computer program, or application, under trace. The merged symbol file contains information useful in performing symbolic resolution of address information in trace files for each instance of a module.

During post processing of the trace information generated by a performance trace of a computer program, symbolic information stored in the merged symbol file is compared to the trace information stored in the trace file. The post processing typically occurs shortly after the trace or at some remote time after the trace of the computer program.

The trace information includes information identifying the modules that are loaded during the trace of the computer application. This trace information and the merged symbol file are used to produce reports. The correct symbolic information in the merged symbol file for the loaded modules is identified based on a number of validating criteria. Alternatively, the correct symbolic information in the merged symbol file for the modules used in the trace, or interrupted in the case of profiling, is identified based on a number of validating criteria.

The correct symbolic information for the required modules may then be stored as an indexed database that is indexed, for example, by process and address identifiers. The indexed database of symbolic information may be stored as a separate file or as a separate portion of a trace file for the computer application. This indexed database may then be used to resolve address information into corresponding symbolic information when providing the trace information for use by a user, such as a performance analyst.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3A is a block diagram illustrates the relationship of software components operating within a computer system that may implement the present invention;

FIG. 3B is an exemplary block diagram of a Java Virtual Machine (JVM) according to the present invention;

FIG. 11 is an exemplary diagram of performance trace data that may be stored as a trace file or maintained in the trace buffer;

FIG. 12 is an exemplary diagram of a Module Table Entry file in accordance with the present invention;

FIG. 13A is an exemplary diagram of an indexed database according to the present invention;

FIG. 13B is a flowchart outlining an exemplary operation of a post-processor for generating an indexed database based on the MTE data and the merged symbol file;

FIG. 14 is a flowchart outlining an exemplary operation of the present invention when generating an indexed database of symbolic data;

FIG. 19 is an exemplary diagram of a portion of a typical Basic Block File (.bbf) for a computer program;

FIG. 20 is an exemplary diagram of a portion of a .bbf for a computer program in accordance with the present invention.

DETAILED DESCRIPTION OF THE PREFERRED EMBODIMENT

Figure 1:
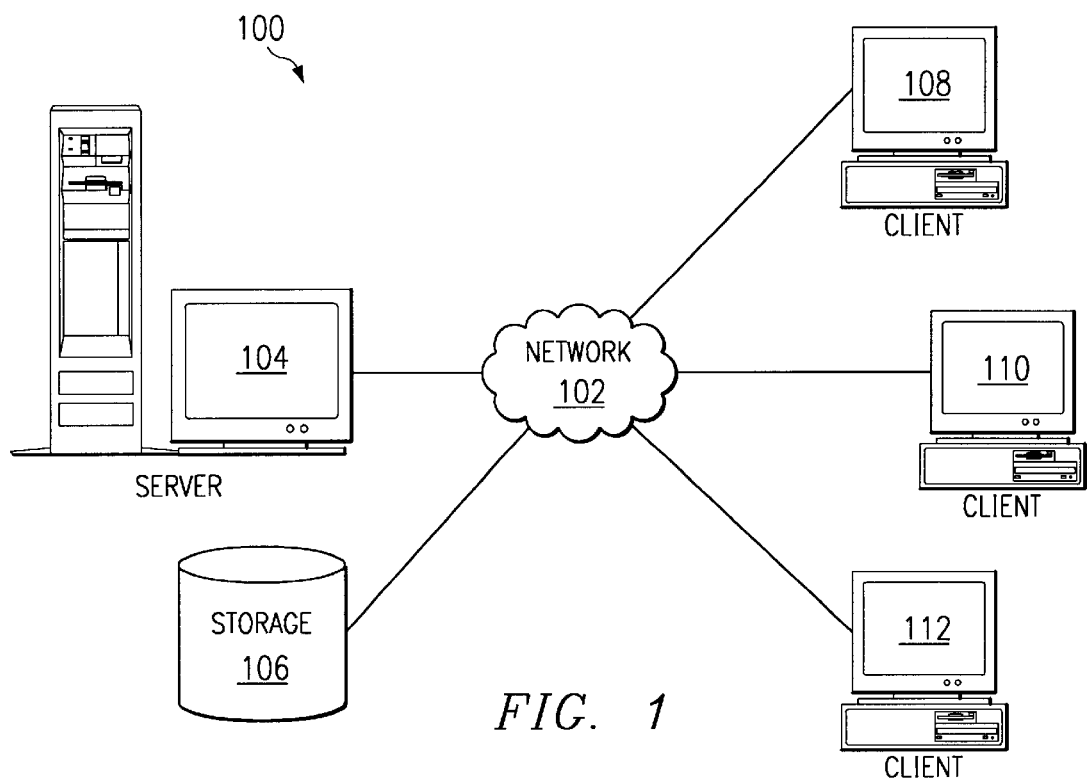
FIG. 1 is an exemplary block diagram of a distributed data processing system according to the present invention.

With reference now to the figures, and in particular with reference to FIG. 1, a pictorial representation of a distributed data processing system in which the present invention may be implemented is depicted. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention. The present invention may be implemented in the depicted distributed data processing system or modifications thereof as will be readily apparent to those of ordinary skill in the art.

Figure 2A:
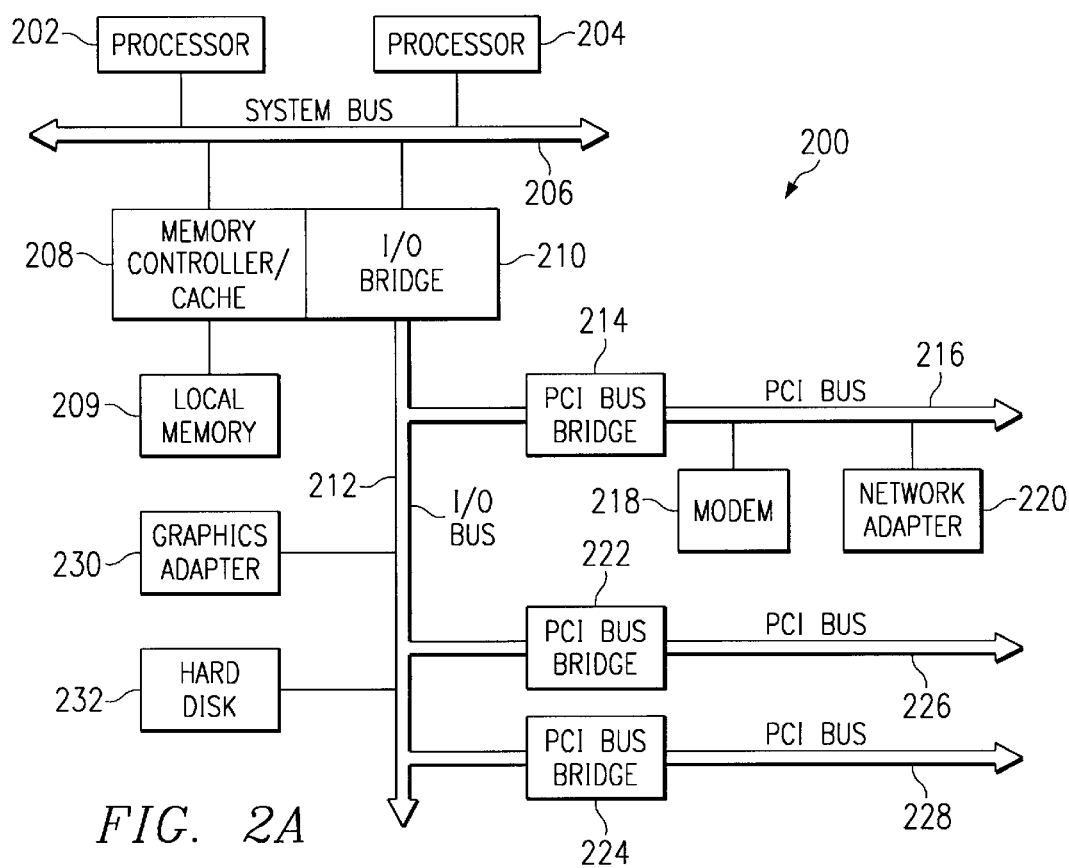
FIG. 2A is an exemplary block diagram of a data processing system according to the present invention.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

Figure 2B:
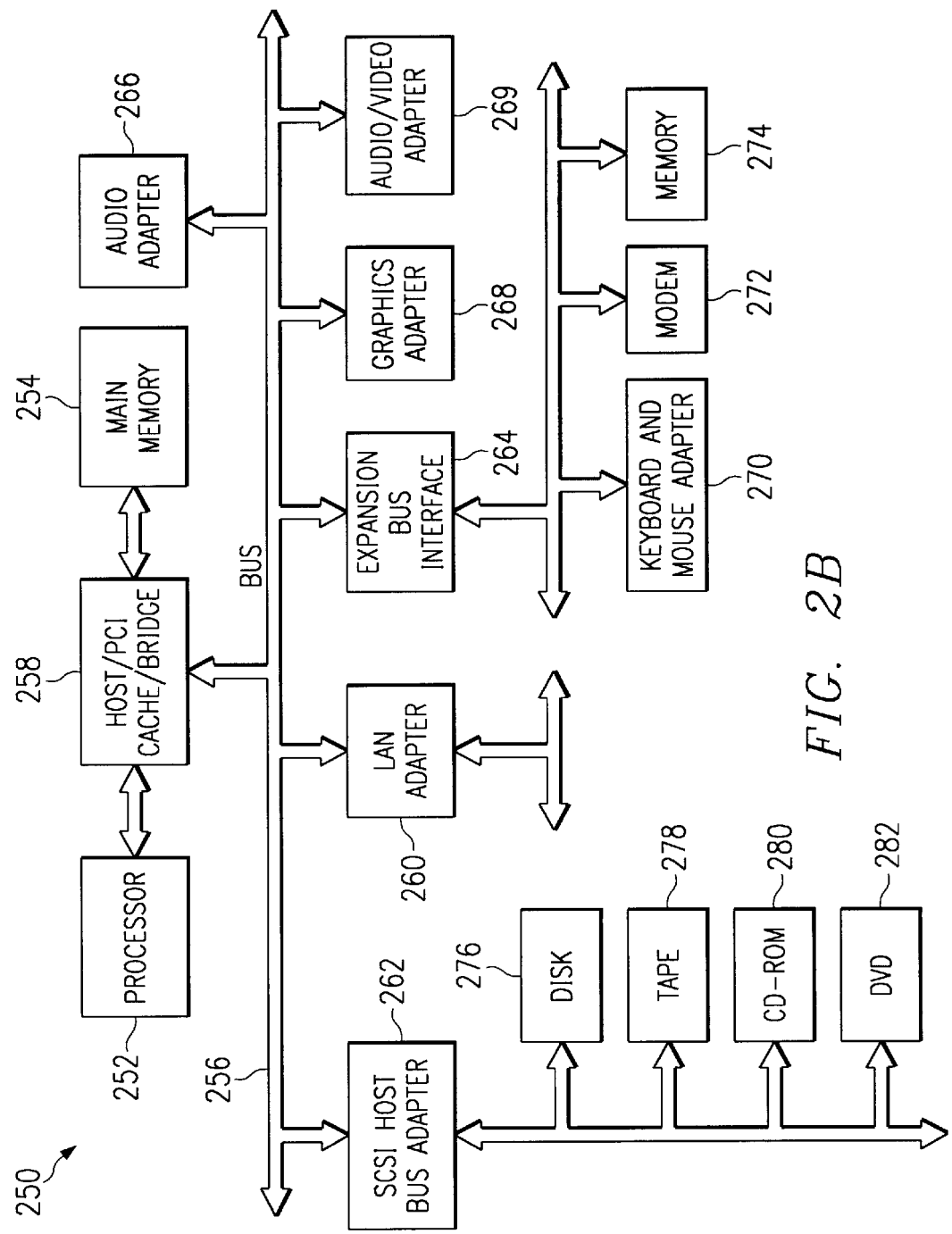
FIG. 2B is an exemplary block diagram of a data processing system according to the present invention.

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as JavaOS For Business™ or OS/2™, which are available from International Business Machines Corporation. JavaOS is loaded from a server on a network to a network client and supports Java programs and applets. A couple of characteristics of JavaOS that are favorable for performing traces with stack unwinds, as described below, are that JavaOS does not support paging or virtual memory. An object oriented programming system such as Java may run in conjunction with the operating system and may provide calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides a method and system for processing performance trace data of software applications. Although the present invention may operate on a variety of computer platforms and operating systems, it may also operate within an interpretive environment, such as a REXX, Smalltalk, or Java runtime environment, and the like. For example, the present invention may operate in conjunction with a Java virtual machine (JVM) yet within the boundaries of a JVM as defined by Java standard specifications. In order to provide a context for the present invention with regard to an exemplary interpretive environment, portions of the operation of a JVM according to Java specifications are herein described.

With reference now to FIG. 3A, a block diagram illustrates the relationship of software components operating within a computer system that may implement the present invention. Java-based system 300 contains platform specific operating system 302 that provides hardware and system support to software executing on a specific hardware platform. JVM 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded pico-Java core. At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system.

The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code.

A JVM must load class files and execute the bytecodes within them. The JVM contains a class loader, which loads class files from an application and the class files from the Java application programming interfaces (APIs) which are needed by the application. The execution engine that executes the bytecodes may vary across platforms and implementations.

One type of software-based execution engine is a just-in-time (JIT) compiler. With this type of execution, the bytecodes of a method are compiled to native machine code upon successful fulfillment of some type of criteria for "jitting" a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

Interpreting code provides an additional benefit. Rather than instrumenting the Java source code, the interpreter may be instrumented. Trace data may be generated via selected events and timers through the instrumented interpreter without modifying the source code. Performance trace instrumentation is discussed in more detail further below.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

With reference now to FIG. 3B, a block diagram of a JVM is depicted in accordance with a preferred embodiment of the present invention. JVM 350 includes a class loader subsystem 352, which is a mechanism for loading types, such as classes and interfaces, given fully qualified names. JVM 350 also contains runtime data areas 354, execution engine 356, native method interface 358, and memory management 374. Execution engine 356 is a mechanism for executing instructions contained in the methods of classes loaded by class loader subsystem 352. Execution engine 356 may be, for example, Java interpreter 362 or just-in-time compiler 360. Native method interface 358 allows access to resources in the underlying operating system. Native method interface 358 may be, for example, a Java native interface.

Runtime data areas 354 contain native method stacks 364, Java stacks 366, PC registers 368, method area 370, and heap 372. These different data areas represent the organization of memory needed by JVM 350 to execute a program.

Java stacks 366 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it.

The JVM does not have any registers for holding intermediate values; any Java instruction that requires or produces an intermediate value uses the stack for holding the intermediate values. In this manner, the Java instruction set is well-defined for a variety of platform architectures.

PC registers 368 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined.

Native method stacks 364 store the state of invocations of native methods. The state of native method invocations is stored in an implementation-dependent way in native method stacks, registers, or other implementation-dependent memory areas. In some JVM implementations, native method stacks 364 and Java stacks 366 are combined.

Method area 370 contains class data while heap 372 contains all instantiated objects. The JVM specification strictly defines data types and operations. Most JVMs choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 372. JVM 350 includes an instruction that allocates memory space within the memory for heap 372 but includes no instruction for freeing that space within the memory.

Memory management 374 in the depicted example manages memory space within the memory allocated to heap 370. Memory management 374 may include a garbage collector which automatically reclaims memory used by objects that are no longer referenced. Additionally, a garbage collector also may move objects to reduce heap fragmentation.

The present invention is equally applicable to either a platform specific environment, i.e. a traditional computer application environment loading modules or native methods, or a platform independent environment, such as an interpretive environment, e.g., a Java environment loading classes, methods and the like. For purposes of explanation of the features and advantages of the present invention and to accentuate the ability of the present invention to operate in either environment, examples of the operation of the present invention will be described in terms of both a Java environment and a traditional computer operating environment.

The present invention provides a mechanism by which a merged file of the symbolic data is generated. The present invention also provides a mechanism by which performance traces of applications, such as Java applications, and symbolic resolution can be performed in which the symbolic data is verified as being the correct symbolic data for incremental or on-demand resolution of addresses, such as with a performance trace data. In addition, the present invention provides a mechanism by which an indexed database of symbolic data is generated as either a separate file or as a separate section of a trace file. While the present invention is applicable to any incremental or on-demand resolution of symbolic information, the present invention will be explained in terms of a performance trace of a computer program for illustrative purposes.

Figure 4:
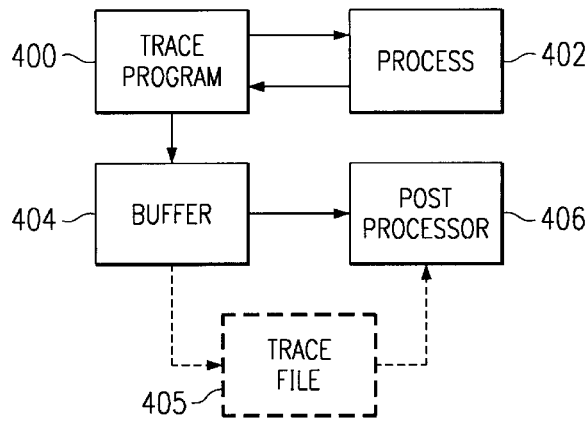
FIG. 4 is a block diagram depicting components used to profile processes in a data processing system.

With reference now to FIG. 4, a block diagram depicts components used to perform performance traces of processes in a data processing system. A trace program 400 is used to profile processes 402. Trace program 400 may be used to record data upon the execution of a hook, which is a specialized piece of code at a specific location in a routine or program in which other routines may be connected. Trace hooks are typically inserted for the purpose of debugging, performance analysis, or enhancing functionality. These trace hooks are employed to send trace data to trace program 400, which stores the trace data in buffer 404. The trace data in buffer 404 may be subsequently stored in a file 405 for post-processing, or the trace data may be processed in real-time. The trace data in either the buffer 404 or the trace file, is then processed by the post-processor 406 to generate an indexed database of symbolic data for loaded modules, as described more fully hereafter.

In a non-Java environment, the present invention employs trace hooks that aid in the identification of modules that are used in an application under trace. With Java operating systems, the present invention employs trace hooks that aid in identifying loaded classes and methods.

In addition, since classes and modules may be loaded and unloaded, these changes may also be identified using trace data. This is especially relevant with "network client" data processing systems, such as those that may operate under Java OS, since classes and jitted methods may be loaded and unloaded more frequently due to the constrained memory and role as a network client. Note that class or module load and unload information is also relevant in embedded application environments, which tend to be memory constrained.

Figure 5:
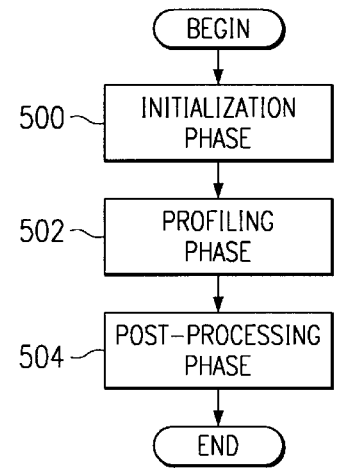
FIG. 5 is an illustration depicting various phases in profiling the active processes in an operating system.

With reference now to FIG. 5, a diagram depicts various phases in performing a performance trace of the workload running on a system. Subject to memory constraints, the generated trace output may be as long and as detailed as the analyst requires for the purpose of profiling a particular program.

An initialization phase 500 is used to capture the state of the client machine at the time tracing is initiated. This trace initialization data includes trace records that identify all existing threads, all loaded classes (modules), and all methods (sections) for the loaded classes (modules). Records from trace data captured from hooks are written to indicate thread switches, interrupts, and loading and unloading of classes (modules) and "jitted" methods (sections).

Any class (module) which is loaded has trace records that indicate the name of the class (module) and its methods (sections). In the depicted example, four byte IDs are used as identifiers for threads, classes, and methods. These IDs are associated with names that have been output in the trace records. A trace record is written to indicate when all of the start up information has been written.

Next, during the profiling phase 502, trace records are written to a trace buffer or trace file. In the present invention, a trace buffer may have a combination of types of records, such as those that may originate from a trace hook executed in response to a particular type of event, e.g., a method entry or method exit, and those that may originate from a stack walking function executed in response to a timer interrupt, e.g., a stack unwind record, also called a call stack record.

For example, the following operations may occur during the profiling phase if the user of the profiling utility has requested sample-based profiling information. Each time a particular type of timer interrupt occurs, a trace record is written, which indicates the system program counter. This system program counter may be used to identify the routine that is interrupted. In the depicted example, a timer interrupt is used to initiate gathering of trace data. Of course, other types of interrupts may be used other than timer interrupts. Interrupts based on a programmed performance monitor event or other types of periodic events may be employed, for example.

In the post-processing phase 504, the data collected in the trace buffer is processed or sent to a trace file for post-processing. In one configuration, the file may be sent to a server, which determines the profile for the processes on the client machine. Of course, depending on available resources, the post-processing also may be performed on the client machine.

With the present invention, in accordance with a first exemplary embodiment, the post-processing consists of utilizing a merged symbol file to correlate symbolic data with performance trace data, i.e. to perform symbolic resolution. This may be done with either the performance trace data stored in the trace buffer or the performance trace data in the trace file. The post-processing may be performed as an incorporated operation such that the post-processing is performed immediately after the performance trace is performed, during the performance trace in real time, or at a time remote from the time that the performance trace is performed.

As part of the symbolic resolution process, the symbolic data for the modules/processes is verified as being the correct symbolic data for the versions of the modules/processes in the performance trace data. This verification is based on various criteria including checksum, timestamp, fully qualified path, segment sizes, and the like.

The symbolic resolution provides symbolic data for loaded modules/processes of the application under trace. As a result of the symbolic resolution, an indexed database of the symbolic data for the loaded modules/processes is generated. The indexed database may be based on the performance trace data in the trace buffer or the performance trace data in the trace file, as will be described in more detail hereafter.

Figure 6:
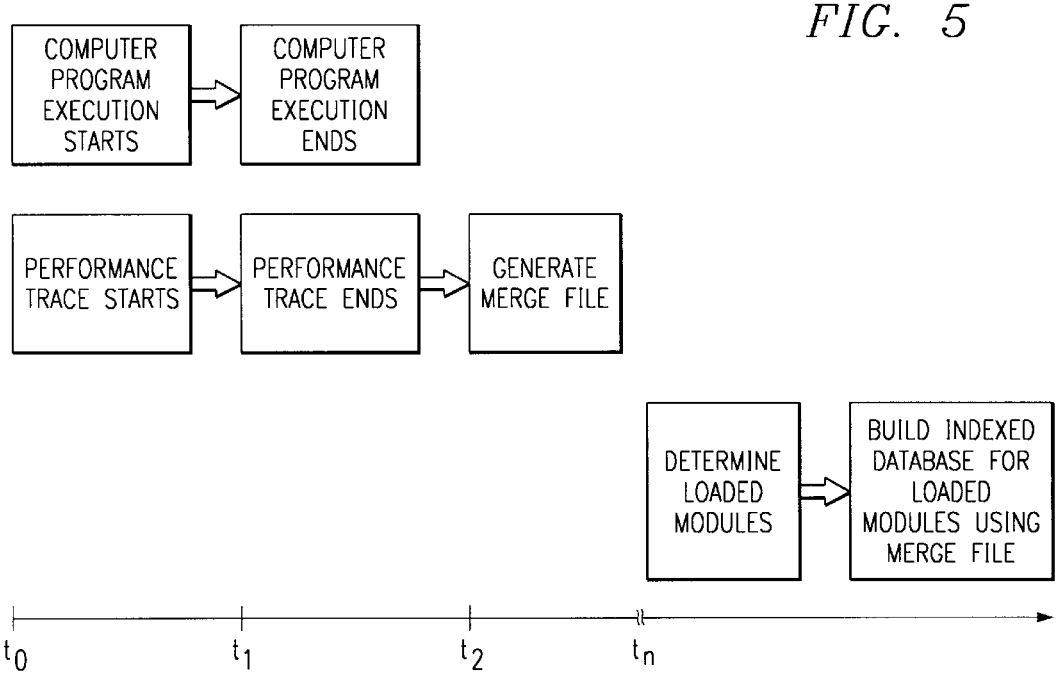
FIG. 6 is an exemplary diagram illustrating a time sequence of events according to the present invention.

FIG. 6 is an exemplary diagram illustrating the time relationship of the various processes employed during a performance trace of an application and subsequent generation of an indexed database for loaded modules/processes. FIG. 6 assumes that the post-processing of the performance trace data is performed at some time after the performance trace is completed. However, as noted above, the post-processing may also be performed during the performance trace such that, as the performance trace data is written to the trace buffer, the post-processing is performed on the written performance trace data. In this way, the amount of time necessary to complete the performance trace and post-processing is reduced.

As shown in FIG. 6, the performance trace is initiated at time $t_0$ when the application execution is started. The performance trace ends at time $t_1$ when the application execution is ended.

Subsequent to the performance trace, at time $t_2$, a merged symbol file of the symbolic data for the application under trace is generated. While FIG. 6 shows the generation of the merged symbol file being performed after the application trace is completed, the invention is not limited to such an embodiment. Rather, the merged symbol file may be generated before the performance trace is initiated or as part of trace finalization. An alternate embodiment may perform symbolic resolution in real-time (during the trace) for concurrent display of trace information.

At some time $t_n$ subsequent to the performance trace and the generation of the merged symbol file, the loaded or used modules/processes during the performance trace are determined and an indexed database of the symbolic data for the loaded or used modules/processes is generated. This indexed database may be generated as a post-processing of the performance trace data in the trace buffer immediately after the performance trace is ended. Alternatively, the indexed database may be generated as a post-processing of the performance trace data stored in a trace file at some time remote from the actual performance trace.

Figure 7:
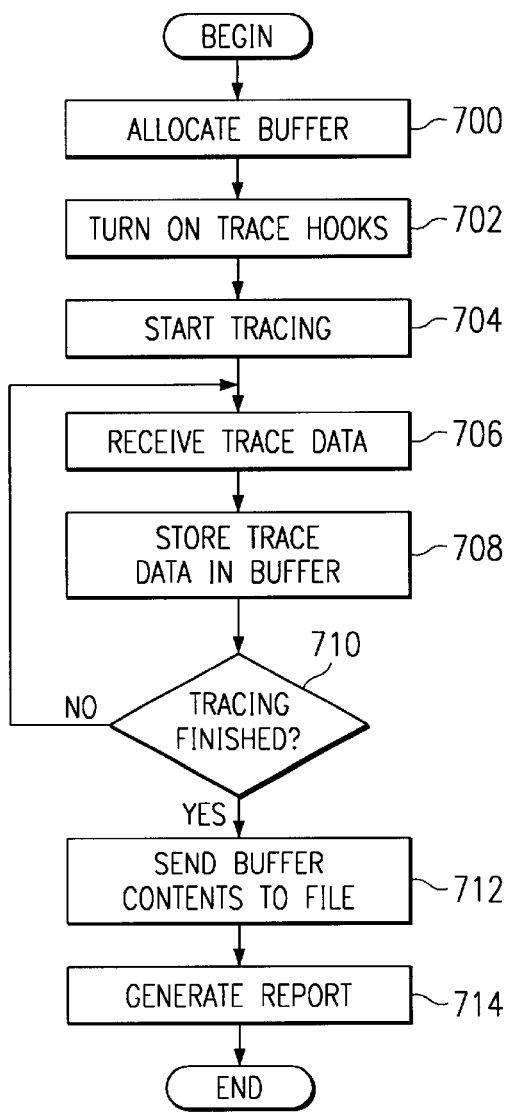
FIG. 7 is a flowchart depicting an exemplary operation of a trace program for generating trace records from processes executing on a data processing system.

With reference now to FIG. 7, a flowchart depicts an exemplary operation of a performance trace tool for generating trace records from modules/processes executing on a data processing system. Trace records may be produced by the execution of small pieces of code called "hooks". Hooks may be inserted in various ways into the code executed by processes, including statically (source code) and dynamically (through modification of a loaded executable). The operation depicted in FIG. 7 is employed after trace hooks have already been inserted into the process or processes of interest. The operation begins by allocating a buffer (step 700), such as buffer 404 in FIG. 4. Next, in the depicted example, trace hooks are turned on (step 702), and tracing of the processes on the system begins (step 704). Trace data is received from the processes of interest (step 706). This type of tracing may be performed during phases 500 and/or 502, for example. This trace data is stored as trace records in the buffer (step 708).

A determination is made as to whether tracing has finished (step 710). Tracing finishes when the trace buffer has been filled or the user stops tracing via a command and requests that the buffer contents be sent to file. If tracing has not finished, the operation returns to step 706 as described above. Otherwise, when tracing is finished, the buffer contents are sent to a file for post-processing (step 712). A report is then generated in post-processing (step 714) with the operation terminating thereafter.

Although the depicted example uses post-processing to analyze the trace records, the operations of the present invention may be used to process trace data in real-time depending on the implementation. If the trace data is processed in real-time, the processing of the trace data in the trace buffer would begin immediately after step 710 above. By processing the trace data in real-time, the dynamic state of the system may be identified. By processing the trace data in real-time, profiler reports may be displayed concurrently with program execution.

This approach is especially useful for jitted methods. A jitted method is converted from bytecodes to machine code just before the program is run. In the case of Java, jitted methods are converted from bytecode to native code. Thus, the dynamic nature of jitted methods may be accommodated by processing trace data dynamically.

Figure 8:
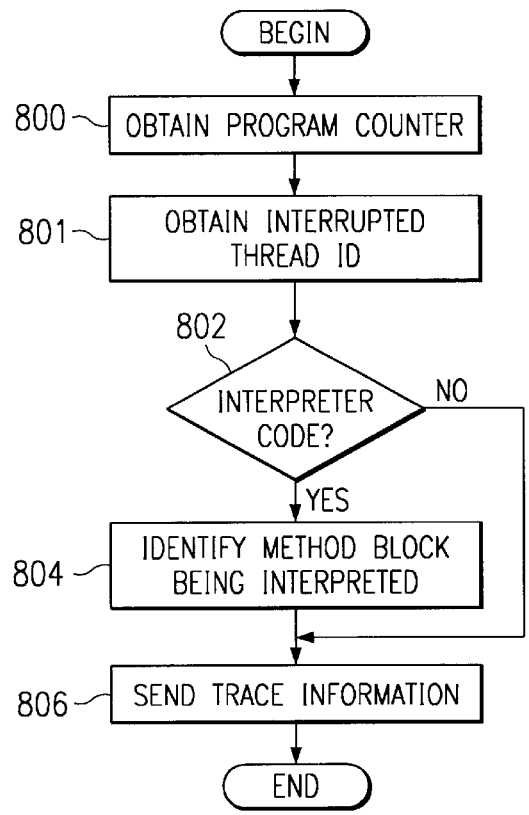
FIG. 8 is a flowchart depicting an exemplary operation of a system interrupt handler trace hook.

With reference now to FIG. 8, a flowchart depicts an exemplary operation that may be used during an interrupt handler trace hook. The operation begins by obtaining a program counter and interrupted thread ID (steps 800–801). Typically, the program counter is available in one of the saved program stack areas. Thereafter, a determination is made as to whether the code being interrupted is interpreted code (step 802). This determination may be made by determining whether the program counter is within an address range for the interpreter used to interpret bytecodes.

If the code being interrupted is interpreted, a method block address is obtained for the code being interpreted. A trace record is then written (step 806). The trace record is written by sending the trace data to a trace program, such as trace program 400, which generates trace records for post-processing in the depicted example. This trace record is referred to as an interrupt record, or an interrupt hook.

This type of trace may be performed during phase 502. Alternatively, a similar process, i.e. determining whether code that was interrupted is interpreted code, may occur during post-processing of a trace file. In this case, the last interpreted method being executed is always written as part of the trace record.

Figure 9:
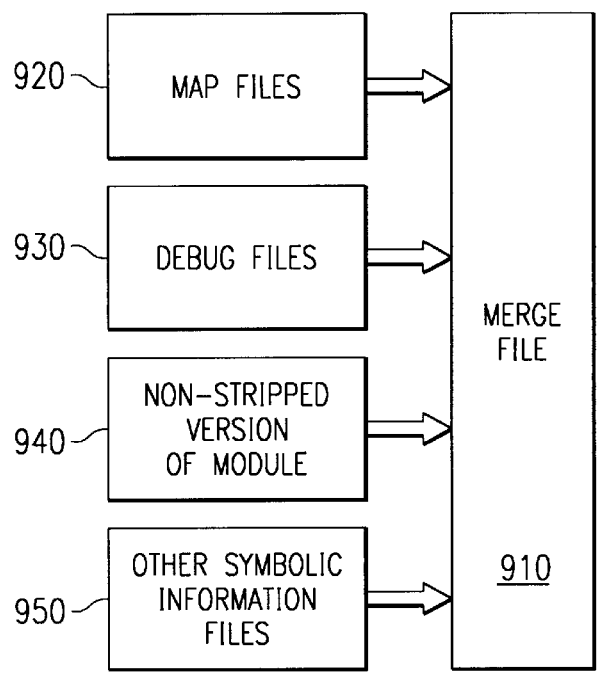
FIG. 9 is an exemplary diagram illustrating the generation of a merged symbol file in accordance with the present invention.

As described above, either before, during or after the performance trace is performed, a merged symbol file of the symbolic data for the application under trace is generated. FIG. 9 is a graphical depiction of the generation of the merged symbol file according to the present invention for a traditional computer execution environment.

As shown in FIG. 9, the merged symbol file 910 is comprised of symbolic data for modules obtained from map files 920, debug files 930, non-stripped versions of modules 940, and other symbolic data files 950. These sources of symbolic data may be stored, for example, in local memory 209, hard disk 232, one or more of the devices 276–282, or any other type of data storage device. The merged symbol file 910 may likewise, be stored in any of these storage devices or the like.

The data processing system of the present invention is provided with the fully qualified path of the various sources of symbolic data and combines symbolic information describing various executable files into a single, merged symbol file. An exemplary embodiment of the format of this file is described in FIG. 10A.

The resulting merged symbol file has one entry (represented abstractly by a HeaderData entry in the merged symbol file) for each module. There may be multiple entries for modules with the same name if, for instance, multiple versions of a module exist on the system or if there are distinct modules with identical names in different paths on the system.

Figure 10A:
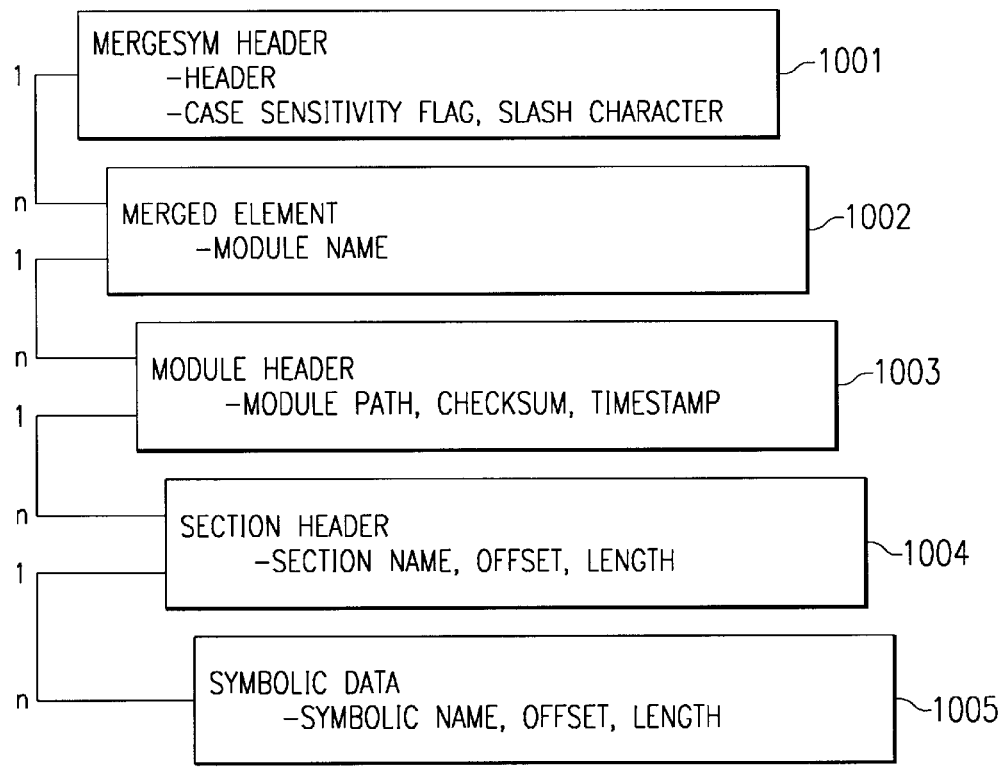
FIG. 10A is an exemplary diagram illustrating the organization of a merged symbol file in accordance with the present invention.

FIG. 10A is an exemplary diagram illustrating the organization of a merged symbol file in accordance with the present invention. As shown in FIG. 10A, the merge symbol file is organized in a hierarchical manner. At the top of the hierarchy is information 1001 identifying the particular platform on which the application is located. This information includes a header, a case sensitivity flag, slash character, and the like.

At the next level of the hierarchy the merged elements 1002 are identified. The merged elements include n number of modules that are identified by their module name, i.e. the base name without extensions of the particular modules in the application.

Each merged element may represent 1 to n distinct modules that happen to have the same base name. Thus, for example, during creation of the merged symbol file, if an executable, foo.exe, is encountered and a corresponding debug file, foo.dbg, is also encountered, the symbolic data from both of these files is merged into a single image (described by a single data element 1002). If, however, an executable, foo.exe, and a debug file with the same base name, foo.dbg, are encountered but it is determined that these do not correspond to the same module (for example, if they contain different checksum or timestamp, possibly indicating that they correspond to different versions of the module), then two distinct images of the modules (represented by distinct data elements 1002) are created with distinct symbolic information.

These images of the module are identified by module headers 1003 that include the module path, extension, checksum, and timestamp. Each image of the module may contain 1 to n sections, each representing a collection of routines, a collection of writable data elements or read only data elements, and the like.

These sections are identified by a section header 1004 that contains the section name, offset, and length. Each section may contain 1 to n symbolic data 1005. The symbolic data 1005 is identified by the symbolic name, offset from the top of the module and/or a length.

Figure 10B:
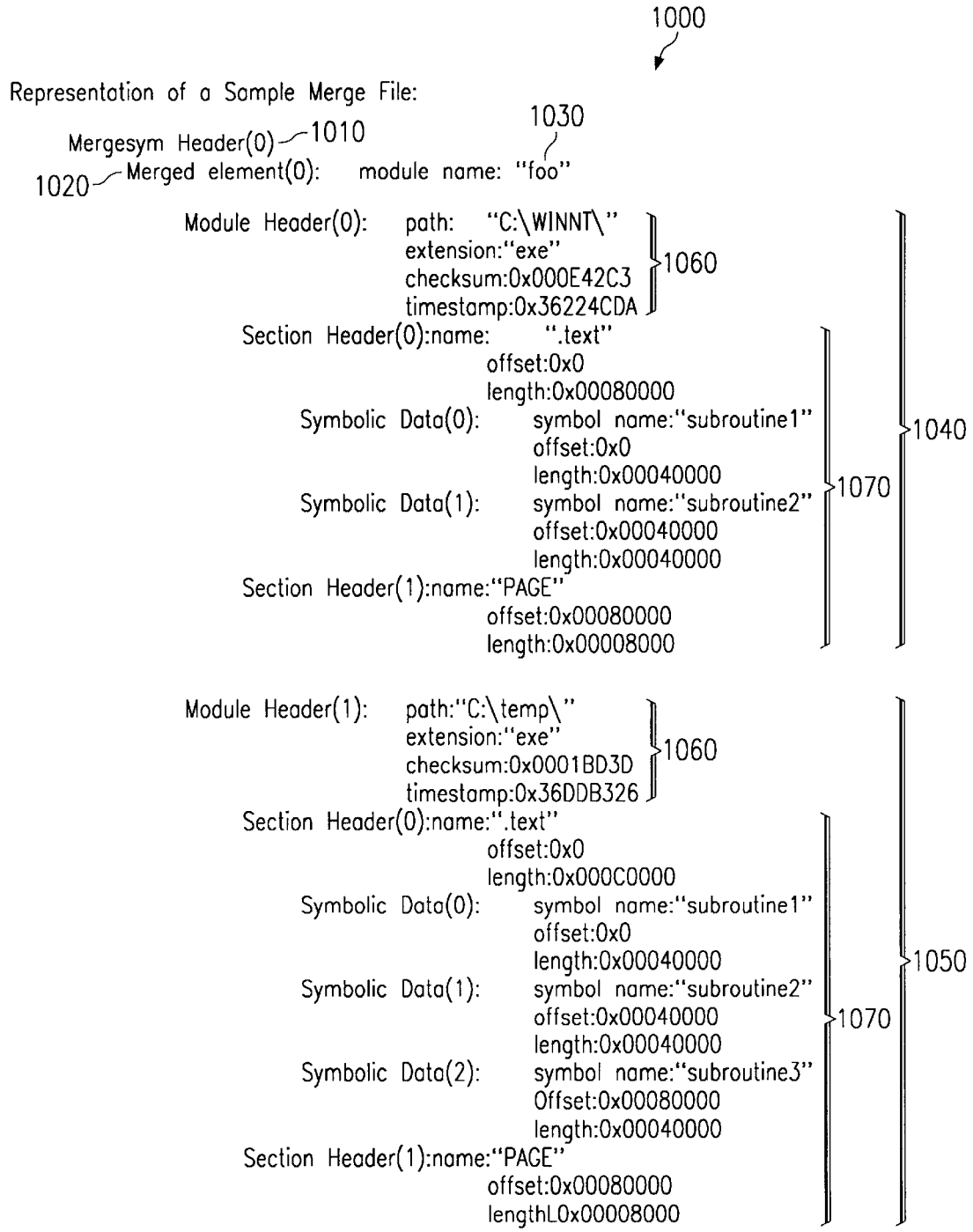
FIG. 10B is an exemplary diagram of a merged symbol file.

FIG. 10B is an example illustration of a merged symbol file in accordance with the present invention. FIG. 10B assumes a non-Java environment and is directed to particular modules of an application. However, the present invention, as noted above, is equally applicable to a Java environment.

As shown in FIG. 10B, the merge symbol file 1000 includes a mergesym header 1010, a merged element identifier 1020, and a module name 1030. The mergesym header 1010, the merged element identifier 1020 and the module name 1030 store information about how the merged symbol file 1000 was generated. In addition, these elements store information about the system on which the file was generated (such as the number of processors or the operating system in use). The merged element identifier 1020 forms a top level index into the merged symbol file 1000 by base name.

The merged symbol file further includes information pertaining to each module having the module name. Thus, in the example shown in FIG. 10B, two modules having the module name "foo" are present in the merged symbol file. Entries 1040 and 1050 for each of the modules is provided in the merged symbol file.

Each entry 1040 and 1050 provides information 1060 pertaining to the identification of a particular module and the symbolic data 1070 associated with the module. The symbolic data is divided into loadable sections having section headers. Each loadable section has a section name, offset and length.

The information 1060 pertaining to the identification of a particular module includes such information as the fully qualified path of the module, the module extension, a checksum, and timestamp for the module. The symbolic data provides the symbol name, offset and length for each symbol. By using the offset and the length associated with the section and the symbolic data, the exact identity of the symbolic data can be determined and correlated with addresses in performance trace data.

In addition to the above, the merged symbol file may include a "confidence" measure, or degree of quality of the symbols, for each module. The confidence measure may be, for example, an indicator of the types of symbolic data that were obtained during the merge process. For example, the confidence measure may provide an indication of whether all the exportable symbols, internal symbols and static symbols have been obtained for the particular module. This confidence measure may be reported to a user for their use in determining the quality of the symbolic resolution in accordance with the present invention.

While the modules shown in FIG. 10B have the same module name, they are different modules as is clear from the module information stored in the merged symbol file. The entries 1040 and 1050 represent different modules in that the path, checksum, timestamp, length, and symbolic data are different for the two modules. The modules themselves may be two different versions of the same module, however. For example, a later version of the "foo.exe" module in the "C:\temp\" directory may have been created and stored in the directory "C:\WINNT\."

When the checksum and the time stamp are not available or the fully qualified path name is not used, known systems of performance tracing are not capable of discerning which of the modules is the correct module for identifying the symbolic data associated with the performance trace data. The known systems match based on base name and are dependent on the user to make sure that the symbols they provide are for the correct versions of the modules.

For example, Windows 2000™, available from Microsoft Corporation, requires the user to specify the fully qualified path name to the source file and to the symbolic information with the exception of some fixed conventions, such as the system directory in the Windows operating systems. This directory is identified by the SystemRoot environment variable. Thus, a default location may be accessed by, for example, the path "%SystemRoot%/Symbols/." Thus, if there are more than one module with the same module name, either as different modules, or different versions of the same module, an error may occur in that the wrong module is used to perform symbolic resolution.

Relying solely on the fully qualified path does not provide a solution to this problem because:

1. the fully qualified path may not be available on all systems;

2. sometimes it is convenient to generate symbols out of a different directory than the one from which the system loads the modules; and 3. The fully qualified path is not a failsafe criterion for matching. If the trace is post processed at a time remote from collection of the trace information itself, then it is possible that a module has been upgraded to a more recent version in the mean time. In this case, the fully qualified paths would match, but one would not want to use the symbols from the module at that location.

The present invention provides a mechanism that works even in the case that it is not possible to obtain trace information that contains the fully qualified path. In addition, the present invention allows for generating symbols out of a different directory than the one from which the system loads the modules. For example, the present invention allows for post processing of trace information and generation of merged symbol files on a system that is not the system under test. Furthermore, the present invention provides a mechanism by which the correct symbolic data is matched with the performance trace data. The mechanism makes use of a number of checks to determine if the module identified in the merged symbol file is the same module as in the performance trace data.

FIG. 11 is an exemplary diagram of performance trace data. The performance trace data 1100 in FIG. 11 may be maintained in the trace buffer or may be written to a trace file following the performance trace. The trace file may be stored, for example, in any of the storage devices 209, 232, 276–282, or the like. The performance trace data includes the following fields:

Field 1: Trace hook major code;
Field 2: Trace hook minor code;
Field 3: Timestamp (upper 32 bits: lower 32 bits);
Field 4: Not used
Field 5: Process identification (pid);
Field 6: Segment load Address;
Field 7: Segment length;
Field 8: Segment Flags (These are flags that indicate permission levels on the pages into which the segment gets loaded and the like);
Field 9: Module checksum;
Field 10: Module timestamp;
Field 11: Segment name; and
Field 12: Module name.

The performance trace data 1100 includes performance trace data for Module Table Entry (MTE) trace hooks as well as time profiler (Tprof) trace hooks.

The fields for MTE trace hooks in the trace file are described above. The MTE trace data is provided in the entries having a trace hook major code of 19 and a minor code of 38. The trace hook major and minor codes 19 and 38 are the major and minor codes that are used in the exemplary embodiment to indicate an MTE hook. Other codes may be used without departing from the spirit and scope of the present invention.

For a Tprof trace hook (major code 10 and minor code 03), the fields will be slightly different in that field 5 will correspond to a program counter, field 6 will correspond to a pid, field 7 will correspond to a thread id, field 8 will correspond to a code privilege level. The code privilege level indicates the privileges that the executing code has. For example, the code privileges level may indicate whether the executing code is in user space or kernel space.

The tprof hooks contain the trace data that is used to profile the system under test. At postprocessing time, the pid and address combinations in the tprof hooks are resolved into symbols. The post processor combines the MTE information and the merged symbol file into an indexed database. When the post processor encounters a tprof hook (or any other type of trace data that contains address information which needs to be translated into a symbol) the post processor looks-up the pid-address combination in the database to get a corresponding symbol.

The MTE information includes an entry representing the loading or unloading of each section in a module. Thus, there is a separate entry for loading the .text section, loading the PAGE section, and unloading the text section (if each of these operations did occur) of C:\WINNT\foo.exe. In the depicted example, the loading of these sections is shown in the lines starting with "19 38." Examples of entries for unloading are shown in the lines starting with "19 39" and "19 44." The unloading entries starting with "19 39" correspond to a standard unloading hook. The unloading entries starting with "19 44" correspond to an unloading hook for a jitted method.

The MTE hook trace data in the performance trace data may be stored as an MTE file. FIG. 12 provides an exemplary diagram of an MTE file 1200. As shown in FIG. 12, the MTE file 1200 contains only the MTE entries in the performance trace data and thus, only identifies the loading and unloading of modules.

In a preferred embodiment of the present invention, the MTE file 1200 is correlated with the merged symbol file to identify the symbolic data for the loaded modules. However, the correlation of performance trace data with the merged symbol file may be performed based on the MTE entries in the performance trace data in the trace buffer or the trace file, such as the performance trace data shown in FIG. 11.

In order to verify that the merged symbol file information for the module corresponds to the same module identified in the MTE file, a number of comparisons are made. First, a comparison of the checksum and timestamp for the module is made. If the checksum and timestamp indicated in the merged symbol file corresponds to the checksum and timestamp in the MTE file, then the module identifiers are determined to correspond and the symbolic data in the merged symbol file is used with the MTE file information to generate loaded module information.

Some files do not contain checksum and timestamp information. For example, Elf object files used in Linux do not contain checksum and timestamp information nor do map files. Thus, for these files, the checksum and timestamp check will normally have a negative result. However, with the map files, for example, other related files, such as .dbg files, can be used in conjunction with the map files to provide necessary information for checking the validity of the map files. If the checksum and timestamp do not match or are not available, the fully qualified path identified in the MTE file is matched with the fully qualified path in the merged symbol file. If there is a match, the module is verified and the symbolic data in the merged symbol file corresponding to the verified module entry is used to generate loaded module information.

If the fully qualified path does not match, a comparison of segment sizes is made between the merged symbol file and the MTE file. Thus, for example, the segment length in field 7 of the MTE file, is compared to the segment length for the segment, in the merged symbol file, of the module identified in field 11 of the MTE file. If the segment length corresponds, then that segment is "matched." When all the segments are matched, the module is verified and the symbolic data in the merged symbol file is used to generate loaded module information.

This series of comparisons may be performed for each module in the merged symbol file having the appropriate module name. Thus, for example, the above comparisons are performed for the first "foo" module (Module Header(0)) and if there is no match, then for the second "foo" module (Module Header(1)).

In an alternative embodiment, each comparison may be made regardless of whether a previous comparison resulted in a verified module. Thus, for example, the checksum, timestamp, fully qualified path, and segment sizes are compared for each of the "foo" modules and the one with the best correlation is chosen as the right module to be used for generating loaded module information. For example, if the first "foo" module was verified based on the segment sizes and the second "foo" module were verified based on the fully qualified path, since the fully qualified path has a greater probability of identifying the correct module entry, the second "foo" module is chosen to generate loaded module information.

Once a module is verified, an indexed database entry is created based on the verified module symbolic data. This operation is performed for each MTE entry in the performance trace file or MTE file.

The indexed database entries may be indexed based on any searchable value. In a preferred embodiment, the indexed database is indexed based on the process identifier (pid) and the segment load address, however, other searchable indices may be used without departing from the spirit and scope of the present invention.

During post-processing, as the post-processor encounters an MTE entry in the performance trace file or MTE file, depending on the particular implementation, the segment is matched to a corresponding segment in the merged symbol file, as described above. As the MTE entry is processed, an indexed database entry is created with the pid and segment load address obtained from the performance trace file and the segment name as obtained from the merged symbol file.

FIG. 13A is an exemplary extracted portion of an example of a simplified indexed database 1300 according to the present invention. As shown in FIG. 13A, entries in the indexed database 1300 include an index 1310 (pid:address) and corresponding symbolic data 1320, i.e. the subroutine names. Thus, when a particular pid:address is encountered in the performance trace file, the pid:address may be converted into a particular symbolic location of a particular location within an executable file. The symbol itself corresponds to a subroutine (or java method).

A segment usually contains multiple subroutines. Thus, for example, if a tprof record is encountered with pid 2 and address 80298000, it would get resolved to 18000 bytes beyond the beginning of subroutine 2 in the version of foo.exe in the directory C:\\temp\. This can be represented as: C:\\temp\foo.exe(subroutine2+0×18000).

As mentioned above, the indexed database 1300 is obtained through a process of matching pid:address combinations obtained from MTE file data, such as MTE file 1200, with section data in the merged symbol file, such as merged symbol file 1000. FIG. 13B is a flowchart outlining an exemplary operation of a postprocessor for generating the indexed database 1300 based on the MTE data and the merged symbol file. As shown in FIG. 13B, the operation starts with the post-processor encountering a MTE hook in the MTE data (step 1310). The MTE data identifies a pid and address. The pid and address are used by the post-processor to identify a module and section within the module in the merged symbol file (step 1320).

The post-processor then computes an offset of the address from the top of the module containing the section (step 1330). This offset is used by the post-processor to identify the symbolic data for the symbol (step 1340). The resulting symbolic data is stored in the indexed database in association with the pid:address (step 1350).

The indexed database 1300 may be stored as a separate file on a storage medium, such as hard disk 232 or disk 276, in memory, such as local memory 209 or memory 274, or may be stored as a separate part of the performance trace file when the performance trace file is written to a storage medium. For example, the indexed database 1300 may be stored at the end of the performance trace file such that, when performance analysis is performed by a user, the performance trace file information may be used to identify the particular modules and segments of the application that were loaded.

In this way, a user of the performance trace tools of the present invention may perform analysis of the performance of an application by identifying the particular loaded modules and segments of the application. In addition, the user may identify the amount of computing time used by particular modules and segments to identify portions of the application that may be optimized for the particular platform on which the application is running.

FIG. 14 is a flowchart outlining an exemplary operation of the data processing system according to the present invention when generating an indexed database of symbolic data based on a performance trace of a computer program, i.e. an application. While the flowchart shows a particular order to the steps, no order is meant to be implied. Rather, many of the steps may be performed at different times during the operation of the data processing system, such as the capturing of symbolic data and storing the symbolic data in a merged symbol file, which may be performed before, during, or after the execution of a trace.

As shown in FIG. 14, a trace of the computer program is executed (step 1410) and a trace file is generated (step 1420). As described above, this trace file may be resident in the trace buffer or may be written to a storage device.

Loaded module information is generated and stored (step 1430). This may be done, for example, by generating the MTE file that identifies only the loading and unloading of module segments, as described above. The symbolic data for the computer program is captured (step 1440) and stored in a merged symbol file (step 1450).

The symbolic data may be captured based on a user identifying the location of files containing the symbolic data. Alternatively, the capturing of the symbolic data may be based on files having the same file name as the computer program under trace or stored in a predefined directory.

The merged symbol file is then combined with the loaded module information to generate loaded module symbolic data (step 1460). This combination may include the comparisons and verification of modules described above. The loaded module symbolic data is then indexed and stored as an indexed database file (step 1470). The indexed database file may be stored in memory, as a separate file written to a storage device, or as a separate section of the performance trace file written to a storage device, as described above.

The flowchart in FIG. 14 describes the operation of the present invention with the use of a merged symbol file to supply symbolic data, however, the present invention is not limited to the use of a merged symbol file. Rather, any source of symbolic data that may be verified may be used without departing from the spirit and scope of the present invention.

Figure 15:
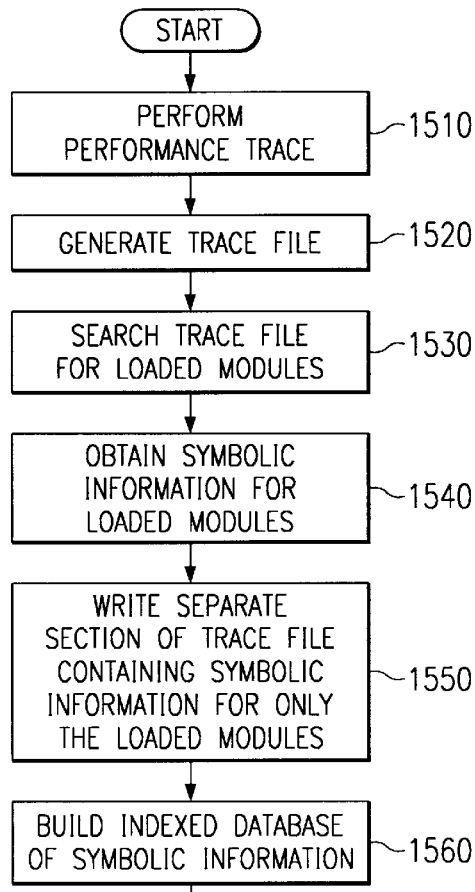
FIG. 15 is a flowchart outlining an exemplary operation of the present invention when generating an indexed database of symbolic data from performance trace data stored in the trace buffer in a dynamic manner.

FIG. 15 is a flowchart outlining an exemplary operation of the data processing system of the present invention when dynamically generating an indexed database of symbolic data, based on performance trace data stored in the trace buffer, that is stored as a separate section of the performance trace file. As with FIG. 14, while the flowchart shows a particular order of steps, no order is meant to be implied and many of the steps may be performed in different orders than that shown.

The steps shown in FIG. 15 are repeated for new performance trace data written to the trace buffer. In this way, an indexed database of symbolic data is dynamically created as the application is under trace.

As shown in FIG. 15, the operation starts with a performance trace of the computer program being performed (step 1510) and a trace file being generated (step 1520). The trace file is searched for loaded module entries (step 1530) and symbolic data for the loaded modules is obtained (step 1540). The symbolic data is preferably obtained from a merged symbol file as described above, however, any source of symbolic data that may be verified may be used without departing from the spirit and scope of the present invention.

Once the symbolic data is obtained for the loaded modules, the symbolic data is stored as a separate section of the trace file containing only the symbolic data for the loaded modules (step 1550). This symbolic data is then indexed to generate an indexed database of symbolic data for the loaded modules as a separate section of the trace file (step 1560).

Thus, using either operation described above, an indexed database of symbolic data for loaded modules is obtained. This indexed database, in a preferred embodiment, is obtained by gathering symbolic data from a plurality of sources into a merged symbol file and then comparing this merged symbol file with performance trace data that is stored in either the trace buffer or in a race file on a storage device. Matching symbolic data is then written to an indexed database in correspondence with the performance trace data.

Figure 16:
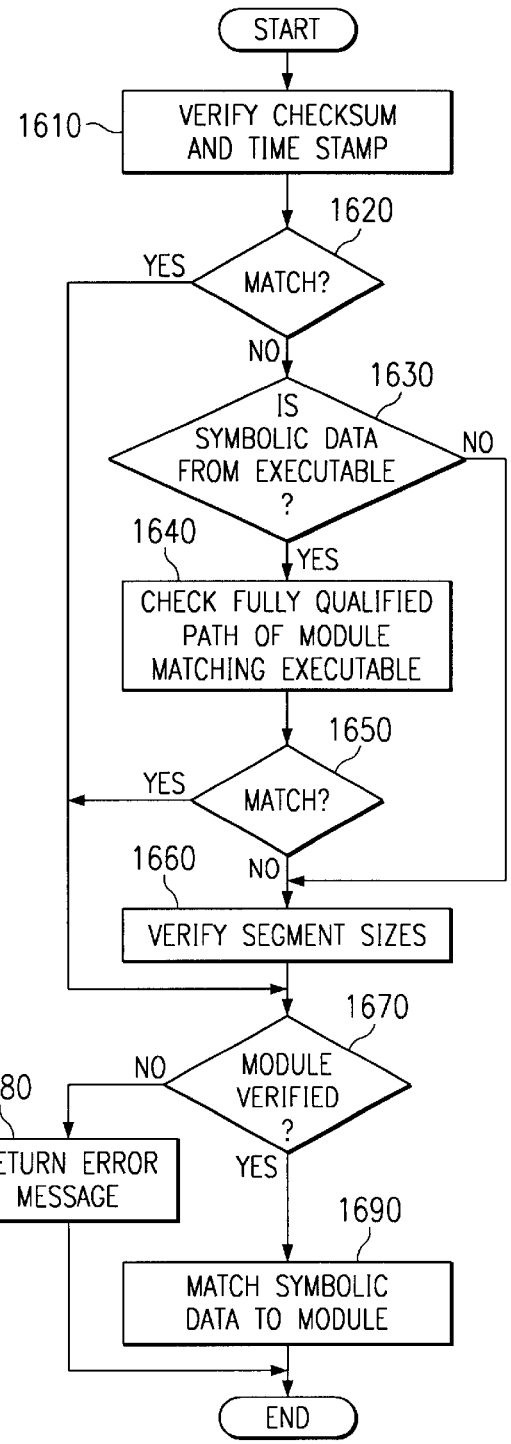
FIG. 16 is a flowchart outlining an exemplary operation of the present invention when verifying the symbolic data and loaded module information.

FIG. 16 is a flowchart outlining an operation of the present invention when comparing the merged symbol file with the performance trace data in order to verify the module symbolic data. While FIG. 16 shows a particular order to the steps, many of the steps may be performed in different orders. Thus, for example, the segment size verification may be performed before the fully qualified path verification, and the like.

As shown in FIG. 16, the operation starts with a verification of the checksum and timestamp for the symbolic data stored in the merged symbol file and the performance trace data (step 1610). It is then determined if there is a match of the merged symbol file symbolic data and the performance trace data (step 1620). If there is a match, the operation continues to step 1670, otherwise, a determination is made as to whether the symbolic data is from an executable module (step 1630). This determination may be made by, for example, determining if the extension of the module as provided in the merged symbol file is ".exe".

If the symbolic data is not from an executable, the operation continues to step 1660, otherwise, a verification of the fully qualified path of the module is performed (step 1640). A determination is made as to whether the fully qualified path verification indicates that the module symbolic data in the merged symbol file matches the performance trace data (step 1650). If there is a match, the operation continues to step 1670, otherwise, the segment size is verified (step 1660).

A determination is made as to whether the module has been verified through one of the above checks (step 1670). If not, an error message is returned (step 1680). If the module has been verified, the symbolic data for the module in the merged symbol file is matched to the performance trace data (step 1690) and the operation ends.

As described above, the verification of symbolic data for a module with the performance trace data may be based on the first matching module entry in the merged symbol file or may involve a "best match" determination of the symbolic data for the module. This "best match" determination may involve determining a match for each module entry in the merged symbol file for a particular module name and identifying which module entry is a best match. The best match may be determined based on the particular attributes that are used to establish the match.

Thus, the attributes may be prioritized to provide a means for determining the best match. As an example, checksum and timestamp may have a highest priority, fully qualified path a second highest priority, and segment size a third highest priority.

Figure 17:
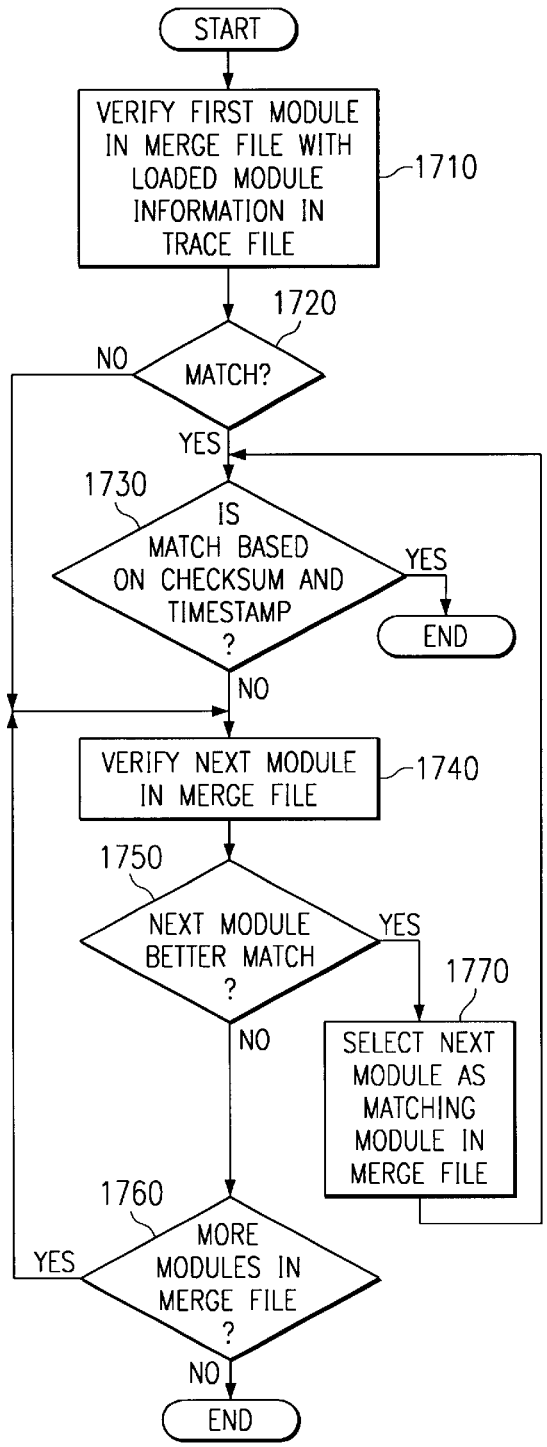
FIG. 17 is a flowchart outlining an exemplary operation of the present invention when obtaining the best match module entry from the merged symbol file.

FIG. 17 is a flowchart of an exemplary operation of the present invention when determining a best match of the symbolic data in the merged symbol file with the performance trace data. As shown in FIG. 17, the operation starts with verifying a first module entry in the merged symbol file with the loaded module information in the performance trace data (step 1710). A determination is made as to whether there is a match of the symbolic data with the performance trace data (step 1720). If not, the next module entry in the merged symbol file is verified (step 1740). If there is a match, a determination is made as to whether the match is based on the checksum and timestamp (step 1730). If the match is based on the checksum and timestamp, then this is the best match and the operation ends. If the match is not based on checksum and timestamp, the next module entry in the merged symbol file is verified (step 1740) and a determination is made as to whether the next module entry is a better match that the first module entry (step 1750).

As described above, this may be based on a priority scheme set for the particular attributes used to verify the module entries. For example, a flag may be set indicating a pointer to the module in the merged symbol file that matched and a number indicating the degree of confidence in the match. The matching criteria may be ranked with checksum and timestamp first, fully qualified path second, and section lengths third. Thus, a 1, 2, or 3 would be recorded to indicate the quality of the match. This match is then compared with a subsequent match and the one with the higher measure of confidence is retained. This confidence indicator may be translated into a message that is reported to a user.

Returning to FIG. 17, if the next module entry is a better match, the next module entry is selected as the matching module in the merged symbol file (step 1760) and the operation returns to step 1730. If the next module is not a better match, a determination is made as to whether there are more module entries to verify (step 1770). If so, the operation returns to step 1740, otherwise, the operation ends.

As described above, the present invention provides a mechanism by which an indexed database of symbolic data for loaded modules is generated. The indexed database may be used by an analysis tool such that the user is presented with a symbolic representation of the loaded modules rather than process identifiers and addresses that may be more difficult to comprehend.

Figure 18:
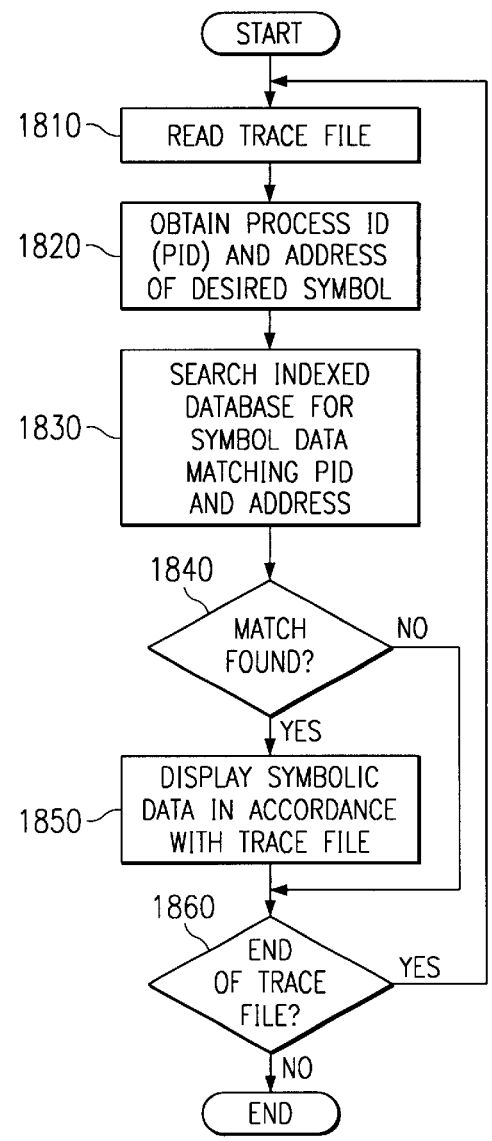
FIG. 18 is a flowchart outlining an exemplary operation of the present invention when generating a display of symbolic trace data.

FIG. 18 is a flowchart outlining an exemplary operation of the present invention when using the indexed database to provide a symbolic representation of performance trace data for analysis by a user. As shown in FIG. 18, the operation starts with reading the trace file (step 1810). The process identifier (pid) and address information are obtained from the trace file (step 1820).

The indexed database is then searched for an entry corresponding to the pid and address (step 1830). A determination is made as to whether there is a match found (step 1840). If so, the corresponding symbolic data is used in accordance with the trace file (step 1850). The particular manner in which the symbolic data is used will depend on the particular analysis applications and/or purpose of these applications. Thereafter, or if there is no match, it is determined whether the end of the trace file is encountered (step 1860). If not, the operation returns to step 1810, otherwise, the operation ends.

Thus, with the present invention, a mechanism is provided by which a merged file of symbolic data is generated. The present invention also provides a mechanism by which performance traces of applications, such as Java applications, and symbolic resolution can be performed in which the symbolic data is verified as being the correct symbolic data for the performance trace data. In addition, the present invention provides a mechanism by which an indexed database of symbolic data is generated as either a separate file or as a separate section of a trace file.

The invention as described above is capable of providing dynamic representations of the performance trace by using MTE file information to identify the loading and unloading of modules. In some instances, it is preferable to have static representations of the performance trace at various times during the trace.

Currently known post-processing tools make use of a single static representation for the symbolic address to name information for the trace of a computer program. This static representation is typically generated in two part. The first part is the generation of the MTE data representing the loaded modules at the start of the trace. The second part takes this MTE data and the symbol for those loaded modules and creates the static representation known by its extension as a .bbf. This MTE data typically occurs as part of the start trace (strace) initialization. Alternatively, the MTE data may be collected at the end of the trace. Getting the MTE data at the beginning of the trace does not handle the case where modules are loaded during the trace. Getting the MTE data at the end of the trace does not handle the case where modules are unloaded during the trace or after the trace and before the MTE data is collected.

The .bbf is a static picture of what modules are loaded at a particular time of the trace and the corresponding symbols of the loaded modules. The .bbf differs from the merged symbol file in that the merged symbol file contains symbolic information for all of the modules of a computer system, the .bbf only contains symbolic information for loaded modules. The .bbf represents a collection of programs and other executable code loaded into all processes of the computer system.

FIG. 19 is an example of a portion of a typical .bbf for a computer program. As shown, the .bbf has a pid oriented format where the executable methods are ordered by address within the pid, the segments are ordered by address, and the symbols within the executable methods are ordered by address within the segment.

As mentioned above, the .bbf, in known post-processing tools, is generated at either the start (strace) or the end of the trace of the computer program. Thus, the only information that the analyst can determine from the .bbf is the methods that were loaded at the time the trace of the computer program was initiated or at the time of termination of the trace. Thus, with the known post-processing tools, there is no manner of providing symbolic information for modules that are loaded and unloaded dynamically after strace initialization and before termination.

The present invention uses the merged symbol file and trace information to generate multiple .bbf files for determining which modules were loaded or used during the trace. Symbolic resolution may be performed using all of the .bbf files such that, if a module is not found in one .bbf, it may be found in one of the other .bbf files.

In this second exemplary embodiment of the present invention, the merged symbol file is utilized by the post-processor, along with the MTE file information, to generate static representations, e.g. .bbf files, of the trace of the computer program. These static representations, in the exemplary embodiment, are created at the beginning (strace) and end of the trace. In this way, the beginning static representation includes the modules loaded when the computer program is initialized. The ending static representation identifies the modules that were loaded during the trace. From this information, it is possible to identify modules which were loaded at the start of the trace and unloaded. It is also possible to identify modules that were dynamically loaded during the trace.

The difference between a loaded module and a used module is that a module may be loaded and never used, that is, never referenced by the trace records. This occurs when a module is not executed long enough to be interrupted by a timer profiler tick. Similarly, a module may have been loaded at one point, used, and then unloaded. By constructing a static representation of the trace at the beginning and end of the trace, it can be determined which modules that were loaded upon initialization, which of these modules were used, which of these modules were not used, and which modules were loaded during the trace and used or not used. For example, if a module has an entry in the static representation generated at the beginning of the trace, but does not have an entry in the static representation at the end of the trace, it can be determined that the module was loaded, used and then unloaded. Similarly, if the static representation at the end of the trace has an entry for a module that does not have an entry in the static representation generated at the beginning of the trace, the module must have been loaded during the trace and not used.

The MTE file contains information regarding loaded modules. Using the merged symbol file, in the manner set forth above with regard to performing symbolic resolution to generate an indexed database, symbolic resolution of address information for the loaded modules can be performed. For example, the module information in the trace file/trace buffer is used to identify modules in the merged symbol file to thereby generate an indexed database of symbolic information. This indexed database of symbolic information may then be used along with the MTE file to generate a .bbf file, using symbolic offsets from the beginning of the modules, and the like, for a particular instance in the trace of the computer program. The generation of the .bbf file may be performed at both the beginning and end of the trace, for example.

Thus, using the MTE file and the merged symbol file, a static representation of the trace of the computer program can be generated for various times during the trace, e.g. at the beginning and the end of the trace. This information can then be stored and used to provide symbolic representations of the traced data. Because the static representations only represent loaded modules, and because the static representations are generated for a finite number of points in time in the trace, the amount of information stored for symbolic resolution can be minimized.

Thus, with the present invention, during post-processing, the post-processor may make use of the strace .bbf to perform symbolic resolution of address information. If a module cannot be found in the strace .bbf, i.e. the module was dynamically loaded during the trace, the .bbf generated at the end of the trace can be used to perform the symbolic resolution. Thus, by generating multiple .bbf files during the execution of a trace of a computer program, symbolic resolution of dynamically loaded modules may be performed.

From the example of the .bbf shown in FIG. 19 above, it is evident that, when there are many methods, there may be a lot of duplicative information stored in the .bbf files. For example, if a module has a plurality of segments, the module information for the segment will be repeated for each process that has the same module.

The present invention, in a further embodiment, eliminates a large majority of this duplicative information on systems where the fully qualified path to a module is known during tracing by identifying each loaded module by its fully qualified path during the start trace (strace) initialization. FIG. 20 is an exemplary diagram of a portion of a .bbf according to the present invention.

As shown in FIG. 20, the .bbf is path oriented. That is, the modules are identified by the fully qualified path. The .bbf is constructed in a path oriented manner that only has one entry for each module. This can be done by setting the pid for the module to be a wildcard, e.g. "????". This wildcard entry indicates that the module entry in the .bbf is independent of the pid. With modules that are independent of the pid, the starting address is set to zero and all addresses for the segments and symbolic information are relative addresses. That is, the addresses are relative to the start address of zero. When the fully qualified path of a module is known, the .bbf is constructed with the "????" for the pid. When the fully qualified path of the module is not known, the pid is identified in the .bbf.

When symbolic resolution is performed using the .bbf according to this further embodiment of the present invention, the module may be "looked-up" in the .bbf by its fully qualified path. Thereafter, if there is no match based on fully qualified path, the module may be "looked-up" based on the pid. Since the pid is set to a wildcard for the modules in the .bbf of the present invention, each module entry in the .bbf will be checked to see if there is a match based on the segment size, symbolic address information, and the like, in a similar manner as set forth above with regard to verification of modules using the merged symbols file.

Thus, with the present invention, the amount of information stored in the .bbf is minimized while still maintaining the ability to search the .bbf for matching module entries during symbolic resolution.

It is common for an operating system to load segments, or sections, of a module piecemeal. Thus, execution of a particular segment of a module may occur prior to all of the segments for the module being loaded. Furthermore, some segments of the module may never be loaded during the trace or trace records of their having been loaded may not be available. The present invention provides a mechanism by which symbolic resolution for the segments of a module may be performed without requiring the entire module to be loaded or trace records for the entire module being available.

As mentioned above, and as shown in the sample trace file and MTE file in FIGS. 11 and 12, the present invention may write redundant information to the trace data. This redundant information includes, for example, the module checksum, module timestamp and module fully qualified path.

Because it is not possible to know a priori the order in which segments will be loaded, each of the trace records contain sufficient information for the post-processor to construct an image of the module. This information is used to match the segment in the trace record to the section of the module in the merged symbol file.

In order to match a segment represented by a trace record with a particular section within a module represented in the merged symbol file, the following criteria are considered. If both the segment name in the trace record and the section name in the merged symbol file are not null and they match, then the segment and section are a match. If both the segment name and the section name are null and there is only one segment in the module, then that must be the segment identified in the trace record. If both the segment name and the section name are null and the addresses match, then the segment and section are a match. If both the names are null and the sizes in bytes match, then the segment and the section are a match.

Once the segment and section are matched, the symbolic information can be written to the indexed database in the manner described above. Thus, the present invention provides a means for performing symbolic resolution of segments within modules even when the entire module has not been loaded or trace records for all of the segments of a module are not available.

In the exemplary embodiments described above, the trace information is written to the trace file, or MTE file, when segments of modules are loaded and unloaded. Thus, there are redundant entries for each segment that may be eliminated and still be able to perform symbolic resolution. By removing these redundant entries, the size of the trace file may be greatly reduced.

In some systems, one may be able to update the kernel to add a status field associated with loaded modules. Alternatively, a kernel extension may be used to provide this status field.

With the present invention, when a module is loaded, the updated kernel has associated with the module a "used (or referenced)" trace flag that is associated with the pid of the module. When the module is loaded, this flag is cleared to zero. Thus, the flag indicates that the module has been loaded but has not yet been used or referenced.

As an example when running a time profiling application, when a time profile trace hook is encountered during the trace, the "used" flag for the interrupted module on the interrupted pid is set to one by the trace program. When the module is unloaded, the modified kernel can check the "used" flag (hereafter, called UF) to determine if it has been set. If the UF is set, the trace program can output MTE trace records associated with the module prior to unloading the module.

Similarly at the end of the trace all loaded modules may be check and each with the UF set may have MTE trace records written. During post processing, symbolic information is collected for all modules that have MTE data records; that is, for all modules for which trace data references exist.

While postprocessing the trace and attempting to perform symbolic resolution, the trace records are processed sequentially, searching for the first MTE entry after the trace reference. From this MTE entry and the symbolic information in the merged symbol file, the address to name resolution can be determined. In an alternative embodiment, at the first reference the MTE data for the referenced module is written prior to writing the trace record. With this approach the post-processor does not have to search for the MTE data after the trace reference because it has already been read by the post-processor.

In a further alternative embodiment, a hash table may be created with a key to the hash table being the pid. The data in the hash table may include a list of modules associated with the pid. The hash table may include flags indicating a number of states of the module including whether the trace data for the module has already beeing written, whether the module has been reference before, whether the module has been loaded and used, and the like. These flags can be used in the same manner as the UF described above. In other words, based on the settings of these flags, a determination can be made as to whether or not to write out the trace data to a trace file. In this way, the same type of scheme as described above can be developed by a kernel extension that does not modify the kernel data structures.

Thus, in this further embodiment of the present invention, the number of trace records are reduced and thus, the trace file is minimized. By minimizing the size of the trace file, the amount of post-processing time is also reduced. In addition, by writing the module trace data prior to writing the trace record, the amount of searching performed by the post-processor is also reduced, thereby making post-processing quicker.

Figure 21:
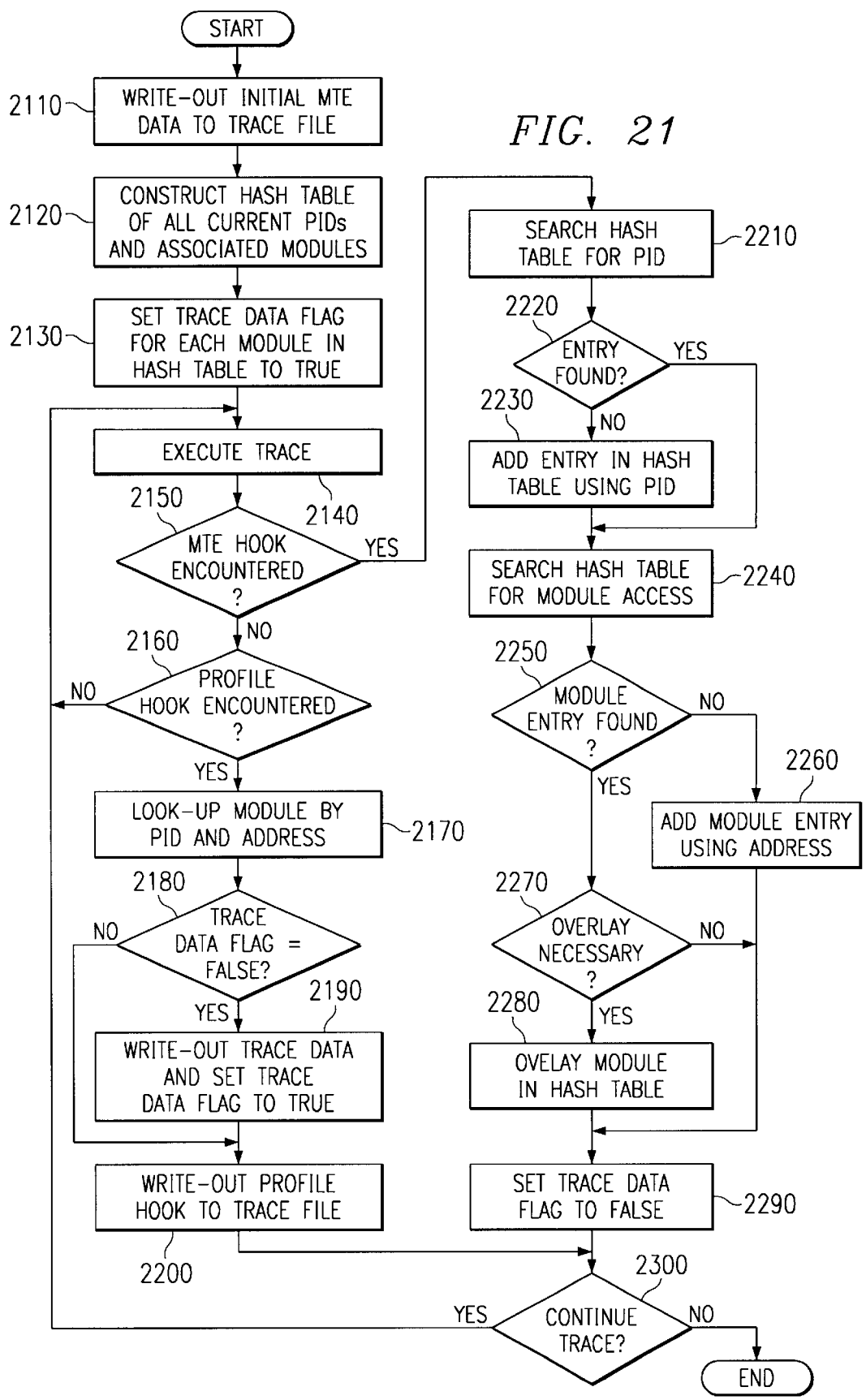
FIG. 21 is a flowchart outlining an exemplary operation of a further embodiment of the present invention.

FIG. 21 is a flowchart outlining an exemplary operation of the present invention in accordance with this further embodiment. As shown in FIG. 21, the operation starts with the initialization of the trace file upon starting a trace of a computer program. During initialization, initial loaded module data, e.g., MTE data, is written out to the trace file for those processes and methods that are loaded at the start of the trace (step 2110). A hash table is constructed for all the currently loaded process ids and the associated modules (step 2120). This involves creating an entry into the hash table for each pid and hanging off of the pid a list of modules associated with the pid. Module information, such as address and, optionally, the length of the module, may be included in the hash table.

Each module in the hash table further includes a trace data flag that indicates whether the trace data for that module has been written to the trace file or trace buffer. Upon initialization, since all of the entries in the hash table correspond to processes and methods that have been written to the trace file or trace buffer in step 2110, the trace data flags for these entries are set to true (step 2130).

The trace is then executed (step 2140) and a determination is made as to whether a MTE trace hook is encountered during the trace (step 2150). If not, a determination is made as to whether a profile hook is encountered (step 2160). If a profile hook is not encountered, the trace is continued by returning to step 2140. If a profile hook is encountered, the module in which the profile hook is encountered is looked-up by pid and module address in the hash table (step 2170). A determination is then made as to whether the trace data flag for the module has been set to false, i.e., the trace data has not been written to the trace file or trace buffer (step 2180). If the trace data flag is false, the trace data is written out to the trace file and the trace data flag is set to true (step 2190). Thereafter, or if the trace data flag is true in step 2180, the profile hook trace data is written to the trace file (step 2200). The trace may then continue if desired (step 2300).

If in step 2150 a MTE hook is encountered, the hash table is searched for the pid associated with the MTE hook (step 2210). A determination is made as to whether an entry for the pid is present in the hash table (step 2220). If not, an entry is added to the hash table using the pid (step 2230).

Thereafter, or if an entry based on the pid is found in the hash table, the hash table is searched for the module address associated with the MTE hook (step 2240). A determination is then made as to whether a module entry based on the module address was found (step 2250). If not, a module entry is added to the hash table using the module address (step 2260). The addition of the module entry is made in association with the pid in the MTE hook.

If a module entry is found in step 2250, a determination is made as to whether a partial or complete overlay of the module entry is necessary (step 2270). If so, the module entry is overlayed with the module information associated with the MTE hook (step 2280). For a partial overlay, this may include adjusting the length of existing module entries associated with the pid and then inserting the module information associated with the MTE hook. For a complete module overlay, this may include deleting an existing module entry and replacing it with a new module entry based on the module information associated with the MTE hook.

A partial or complete overlay may occur when, for example, a process is stopped and a new process is created using the same pid as the previous process. In such a case, the module entry may be overlayed with a new module entry. In an alternative embodiment, the trace file may contain a separate trace entry indicating the stopping of a process and the creation of a new process using the same pid. Thereafter, any further references to the pid will be resolved using the new module entry.

Thereafter, the trace data flag for the module is set to false (step 2290). A determination is then made as to whether to continue the trace (step 2300). If so, the operation returns to step 2140. Otherwise, the operation terminates. During post-processing, the MTE data for the file(s) is/are read in and used in time sequence order.

As described above, the functionality of the hash table for storing status flags and the like, may be performed by updating the kernel to add a status flag associated with loaded modules or by providing a kernel extension. Similarly, a process local storage may be utilized for maintaining this status flag. Alternatively, a process control block of the operating system may be modified directly to maintain this status flag.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

Java is a registered trademark of Sun Microsystems, Inc. for a programming language and associated software. JVM (or Jvm) is a registered trademark of Sun Microsystems, Inc. for a computer program. JavaOS is a registered trademark of Sun Microsystems, Inc. for a computer program.

What is claimed is:

1. A method of performing symbolic resolution of a module using static representations of a trace of a computer program, comprising:

generating a first static representation of the trace at a first time during the trace;

generating a second static representation of the trace at a second time during the trace;

performing symbolic resolution using the first static representation, if the module is present in the first static representation; and performing symbolic resolution using the second static representation for a module, if the module of the computer program is not present in the first static representation of the trace.

2. The method of claim 1, wherein the first time during the trace is at the beginning of the trace and the second time during the trace is at the end of the trace.

3. The method of claim 1, wherein the first static representation and the second static representation are .bbf files.

4. The method of claim 1, wherein performing symbolic resolution using the first static representation and performing symbolic resolution using the second static representation includes using a Module Table Entry file and a merged symbol file to resolve symbolic addresses.

5. The method of claim 1, wherein the first static representation and the second static representation are generated using trace data and a merged symbol file.

6. The method of claim 1, wherein performing symbolic resolution using the first static representation and performing symbolic resolution using the second static representation includes using an indexed database of symbolic information and a Module Table Entry file to resolve symbolic addresses.

7. The method of claim 1, wherein the first static representation includes information identifying modules loaded at a start of the trace and wherein the second static representation includes information identifying modules dynamically loaded during the trace.

8. The method of claim 1, wherein the first static representation and the second static representation includes loaded module entries for modules loaded at a specific time during the trace.

9. The method of claim 8, wherein the loaded module entries include a process identifier and symbol address information.

10. The method of claim 9, wherein the process identifier for a loaded module entry is set to a wildcard process identifier if the module is independent of the process identifier.

11. The method of claim 10, wherein performing symbolic resolution using the first static representation includes searching the first static representation for a fully qualified path that matches a fully qualified path in a Module Table Entry file.

12. The method of claim 11, wherein performing symbolic resolution using the first static representation further includes searching the first static representation for a process identifier that matches a process identifier in the Module Table Entry, if a fully qualified path that matches a fully qualified path in the Module Table Entry file does not exist.

13. A computer program product in a computer readable medium for performing symbolic resolution of a module using static representations of a trace of a computer program, comprising:

first instructions for generating a first static representation of the trace at a first time during the trace;

second instructions for generating a second static representation of the trace at a second time during the trace;

third instructions for performing symbolic resolution using the first static representation, if the module is present in the first static representation; and fourth instructions for performing symbolic resolution using the second static representation for a module, if the module of the computer program is not present in the first static representation of the trace.

14. The computer program product of claim 13, wherein the first time during the trace is at the beginning of the trace and the second time during the trace is at the end of the trace.

15. The computer program product of claim 13, wherein the first static representation and the second static representation are .bbf files.

16. The computer program product of claim 13, wherein the third instructions for performing symbolic resolution using the first static representation and the fourth instructions for performing symbolic resolution using the second static representation include instructions for using a Module Table Entry file and a merged symbol file to resolve symbolic addresses.

17. The computer program product of claim 13, wherein the first instructions for generating the first static representation and the second instructions for generating the second static representation include instructions for using trace data and a merged symbol file to generate a static representation.

18. The computer program product of claim 13, wherein the third instructions for performing symbolic resolution using the first static representation and the fourth instructions for performing symbolic resolution using the second static representation include instructions for using an indexed database of symbolic information and a Module Table Entry file to resolve symbolic addresses.

19. The computer program product of claim 13, wherein the first static representation includes information identifying modules loaded at a start of the trace and wherein the second static representation includes information identifying modules dynamically loaded during the trace.

20. The computer program product of claim 13, wherein the first static representation and the second static representation include loaded module entries for modules loaded at a specific time during the trace.

21. The computer program product of claim 20, wherein the loaded module entries include a process identifier and symbol address information.

22. The computer program product of claim 21, wherein the process identifier for a loaded module entry is set to a wildcard process identifier if the module is independent of the process identifier.

23. The computer program product of claim 22, wherein the third instructions for performing symbolic resolution using the first static representation includes instructions for searching the first static representation for a fully qualified path that matches a fully qualified path in a Module Table Entry file.

24. The computer program product of claim 23, wherein the first instructions for performing symbolic resolution using the first static representation further includes instructions for searching the first static representation for a process identifier that matches a process identifier in the Module Table Entry, if a fully qualified path that matches a fully qualified path in the Module Table Entry file does not exist.

25. An apparatus for performing symbolic resolution of a module using static representations of a trace of a computer program, comprising:

A trace data storage device for storing trace data; and

A processor coupled to the trace data storage device, wherein the processor generates a first static representation of the trace data at a first time during the trace, generates a second static representation of the trace data at a second time during the trace, performs symbolic resolution using the first static representation, if the module is present in the first static representation, and performs symbolic resolution using the second static representation for a module, if the module of the computer program is not present in the first static representation of the trace.

26. The apparatus of claim 25, wherein the first time during the trace is at the beginning of the trace and the second time during the trace is at the end of the trace.

27. The apparatus of claim 25, wherein the first static representation and the second static representation are .bbf files.

28. The apparatus of claim 25, wherein the processor performs symbolic resolution using the first static representation and performs symbolic resolution using the second static representation using a Module Table Entry file and a merged symbol file to resolve symbolic addresses.

29. The apparatus of claim 25, wherein the first static representation and the second static representation are generated using the trace data and a merged symbol file.

30. The apparatus of claim 25, wherein the processor performs symbolic resolution using the first static representation and performs symbolic resolution using the second static representation by using an indexed database of symbolic information and a Module Table Entry file to resolve symbolic addresses.

* * * * *